(12) United States Patent
Thean

(10) Patent No.: US 10,929,788 B2
(45) Date of Patent: *Feb. 23, 2021

(54) METHOD, COMPUTER PROGRAM PRODUCT, AND APPARATUS FOR PROVIDING AN ENERGY MAP

(71) Applicant: LEADLINE LLC, Charlotte, NC (US)

(72) Inventor: Patrick Thean, Charlotte, NC (US)

(73) Assignee: Leadline, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,331

(22) Filed: Jul. 1, 2019

(65) Prior Publication Data

US 2020/0027041 A1    Jan. 23, 2020

Related U.S. Application Data

(63) Continuation of application No. 15/822,361, filed on Nov. 27, 2017, now Pat. No. 10,346,771, which is a (Continued)

(51) Int. Cl.
| | |
|---|---|
| *G06F 3/048* | (2013.01) |
| *G06Q 10/06* | (2012.01) |
| *G06F 3/0482* | (2013.01) |
| *G06F 3/0484* | (2013.01) |
| *G06F 3/0481* | (2013.01) |
| *G06T 11/20* | (2006.01) |

(52) U.S. Cl.
CPC ....... *G06Q 10/0631* (2013.01); *G06F 3/0481* (2013.01); *G06F 3/0482* (2013.01); *G06F 3/04842* (2013.01); *G06Q 10/06* (2013.01); *G06T 11/206* (2013.01); *G06T 2200/24* (2013.01)

(58) Field of Classification Search
CPC .......... G06F 3/00; G06F 3/048; G06F 3/0481; G06F 3/0482; G06F 3/0484; G06F 3/04842; G06F 9/4443; G06F 15/00; G06F 15/16; G06F 17/212; G06F 17/24; G06Q 10/06; G06Q 10/0631; G06Q 10/063116; G06Q 10/0639; G06Q 10/06398; G06Q 10/1097; G04F 10/00; H04L 29/06; A61J 7/0481
See application file for complete search history.

(56) References Cited

U.S. PATENT DOCUMENTS 6,963,826 B2    11/2005    Hanaman et al.
7,027,051 B2     4/2006    Alford, Jr. et al.
(Continued)

OTHER PUBLICATIONS

U.S. Appl. No. 12/184,764, filed Aug. 1, 2008, U.S. Pat. No. 8,161,408, Issued.
(Continued)

*Primary Examiner* — Xiomara L Bautista
(74) *Attorney, Agent, or Firm* — Alston & Bird LLP

(57) ABSTRACT

A method for providing an energy map may include receiving an indication of status for each of a plurality of individual entities with respect to corresponding priorities defined for each respective individual entity, correlating received indications of status to respective group priorities, providing a representation of a plurality of the group priorities, and mapping an amount of energy associated with the group priorities by providing a graphical representation of a respective amount of resources associated with the group priorities based on the received indications.

12 Claims, 36 Drawing Sheets

Related U.S. Application Data continuation of application No. 15/083,572, filed on Mar. 29, 2016, now Pat. No. 9,858,541, which is a continuation of application No. 13/975,798, filed on Aug. 26, 2013, now Pat. No. 9,310,979, which is a continuation-in-part of application No. 13/448,143, filed on Apr. 16, 2012, now Pat. No. 8,522,166, which is a continuation of application No. 12/184,764, filed on Aug. 1, 2008, now Pat. No. 8,161,408.

(56) References Cited

U.S. PATENT DOCUMENTS

| | | |
|---|---|---|
| 7,082,576 B2 | 7/2006 | Shahine et al. |
| 7,523,408 B2 | 4/2009 | Barrios et al. |
| 7,912,930 B1 | 3/2011 | Farooqi et al. |
| 2004/0070627 A1 | 4/2004 | Shahine et al. |
| 2005/0021429 A1 | 1/2005 | Bates |
| 2007/0038494 A1 | 2/2007 | Kreitzberg et al. |
| 2007/0203775 A1 | 8/2007 | Busch et al. |
| 2007/0226679 A1 | 9/2007 | Jayamohan et al. |
| 2008/0172312 A1 | 7/2008 | Synesiou et al. |
| 2009/0199192 A1 | 8/2009 | Laithwaite et al. |

OTHER PUBLICATIONS

U.S. Appl. No. 13/448,143, filed Apg. 16, 2012, U.S. Pat. No. 8,522,166, Issued.
U.S. Appl. No. 13/975,798, filed Aug. 26, 2013, U.S. Pat. No. 9,310,979, Issued.
U.S. Appl. No. 15/083,572, filed Mar. 29, 2016, U.S. Pat. No. 9,858,541, Issued.
U.S. Appl. No. 15/822,361, filed Nov. 27, 2017, U.S. Pat. No. 10,346,771, Issued.

Quarterly Plan

What's the Quarter about

Outcomes:

Theme Name

Describe Success/Reward

Deadline:     Date

Critical #'s

Counter Balance with

Company Priorities (Group priorities)

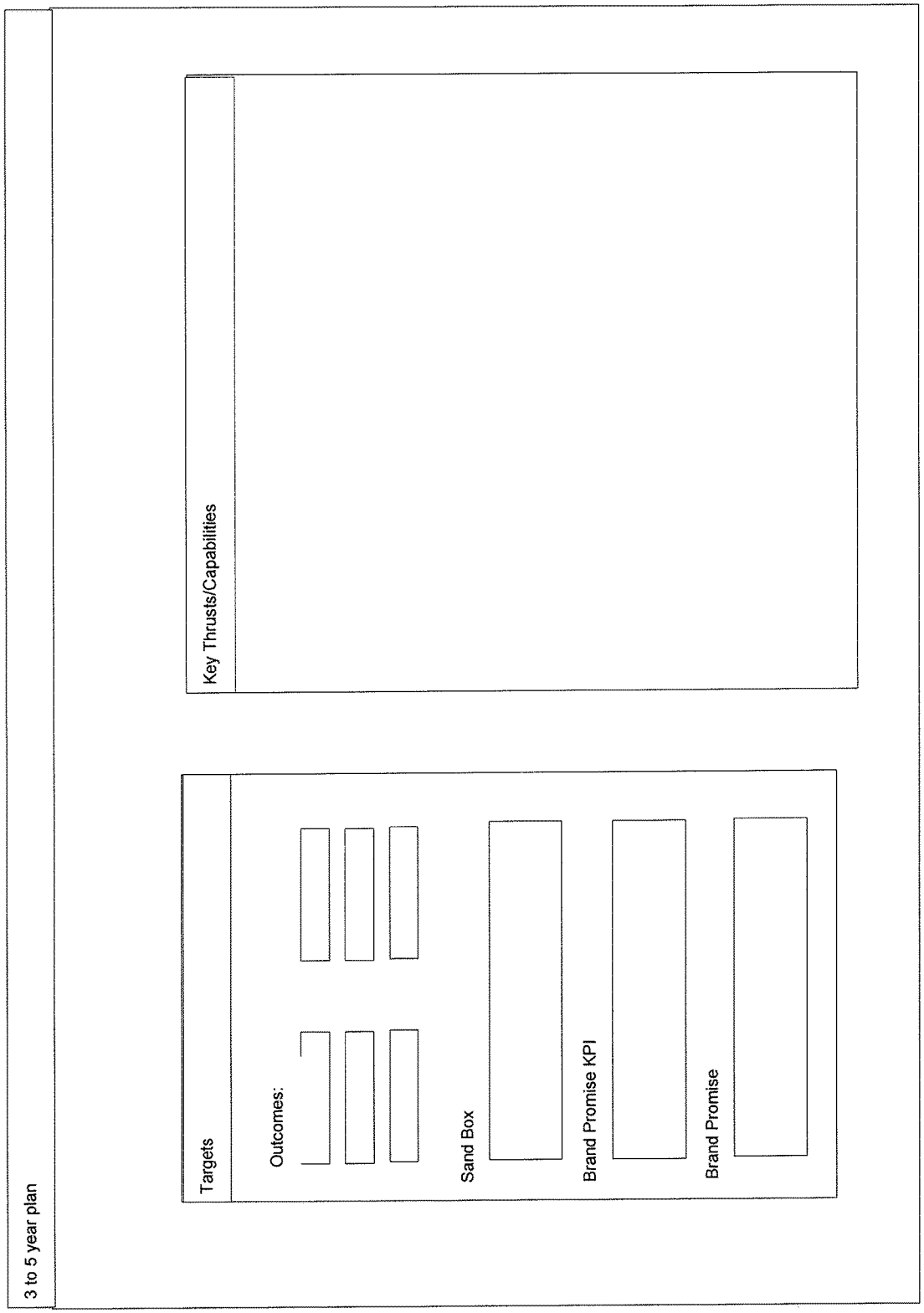

What's the Year About

Year:

Outcomes

Brainstorm Your Year

Idea vote

Theme

METHOD, COMPUTER PROGRAM PRODUCT, AND APPARATUS FOR PROVIDING AN ENERGY MAP

CROSS REFERENCE TO RELATED APPLICATION

This application is a continuation of Ser. No. 15/822,361, filed Nov. 27, 2017, is a continuation of U.S. application Ser. No. 15/083,572, filed Mar. 29, 2016, now U.S. Pat. No. 9,858,541, which is a continuation of U.S. application Ser. No. 13/975,798, filed Aug. 26, 2013, now U.S. Pat. No. 9,310,979, which is a continuation-in-part of U.S. application Ser. No. 13/448,143, filed Apr. 16, 2012, now U.S. Pat. No. 8,522,166, which is a continuation of U.S. application Ser. No. 12/184,764, filed Aug. 1, 2008, now U.S. Pat. No. 8,161,408. All of the above applications are hereby incorporated by reference herein in their entirety.

FIELD OF THE INVENTION

Embodiments of the present invention relate generally to technologies related to facilitating management processes, and more particularly, to a mechanism for enabling an individual to review the amount of energy devoted to addressing various group priorities.

BACKGROUND OF THE INVENTION

Many companies or enterprises include executive management teams that handle various responsibilities related to achieving company priorities. For many senior executives, the definition of company priorities and the tracking of progress toward achieving the defined priorities play an important role in the performance of their jobs. In this regard, for example, senior executives often assign tasks to junior team members in which each assigned task relates to a company priority. Company priorities may also have either an implicit or even explicit ranking or level of importance associated therewith. Thus, senior executives may, at times, wish to reallocate resources from less important priorities to more important priorities in order to provide better resource utilization and more efficient progress toward achieving the most important priorities.

Numerous executive dashboards have been developed in the past in order to help executives absorb large quantities of information, or at least key bits of information, in a relatively short time. In this regard, dashboards often provide a graphical representation of key performance indicators or other information in a relatively easy to read manner. However, current dashboards are often limited to the specific purposes for which they have been constructed. Accordingly, it is often difficult for senior executives to keep track of which team members are assigned to each respective priority and to determine how much energy or what quantity (or quality) of resources is being devoted to a given defined priority. Accordingly, it may be desirable to provide an improved mechanism for tracking company resource utilization. Further, it may be desirable to provide mechanisms for improving visualization and understanding of how execution items are aligned to achieve company strategies.

BRIEF SUMMARY OF THE INVENTION

In order to improve capabilities with respect to tracking the energy or resources devoted to company priorities, some embodiments of the present invention may provide a mechanism for enabling a mapping of the energy devoted to particular priorities. Some embodiments may further enable a comparison between an ordering or importance of a defined priority and the amount of energy devoted to the defined priority relative to other defined priorities. Moreover, the solution provided by embodiments of the present invention may provide a mechanism for providing an energy map displaying a graphical representation of the amount of resources (e.g., energy) being devoted to a plurality of different priorities so that it may be appreciated as to how company resources are allocated with respect to the goals or priorities that the company has defined to be most important. Accordingly, an appreciation may be achieved with respect to situations for which a reordering of priorities or a reallocation of resources may be desirable.

In one exemplary embodiment, a method for providing an energy map is provided. The method may include receiving an indication of status for each of a plurality of individual entities with respect to corresponding priorities defined for each respective individual entity, correlating received indications of status to respective group priorities, providing a representation of a plurality of the group priorities, and mapping an amount of energy associated with the group priorities by providing a graphical representation of a respective amount of resources associated with the group priorities based on the received indications.

In another exemplary embodiment, a computer program product for providing an energy map is provided. The computer program product includes at least one computer-readable storage medium having computer-executable program code instructions stored therein. The computer-executable program code instructions may include multiple executable portions. In this regard, the program code instruction may be for receiving an indication of status for each of a plurality of individual entities with respect to corresponding priorities defined for each respective individual entity. The second program code instruction may be for correlating received indications of status to respective group priorities. The third program code instruction may be for providing a representation of a plurality of the group priorities. The fourth program code instruction may be for mapping an amount of energy associated with the group priorities by providing a graphical representation of a respective amount of resources associated with the group priorities based on the received indications.

In another exemplary embodiment, an apparatus for providing an energy map is provided. The apparatus may include a processor configured to control a priority tracker and an energy mapper. The priority tracker may be configured to receive an indication of status for each of a plurality of individual entities with respect to corresponding priorities defined for each respective individual entity and correlate received indications of status to respective group priorities. The energy mapper may be configured to provide a representation of a plurality of the group priorities and map an amount of energy associated with the group priorities by providing a graphical representation of a respective amount of resources associated with the group priorities based on the received indications.

Embodiments of the present invention may be employed to produce an executive dashboard that may provide an energy map to enable more efficient management of resources with respect to tracking and achieving defined priorities.

In another exemplary embodiment, a method is provided that includes receiving one or more indications of status for a plurality of individual entities with respect to corresponding execution elements defined for each respective individual entity of the individual entities; correlating the indications of status to at least one individual entity priority in a set of individual entity priorities for a time period; correlating each of the individual entity priorities for the time period to at least one group priority in a set of group priorities for the same time period; correlating each group priority in a set of group priorities for a time period to at least one group priority in a set of group priorities for a subsequent time period; providing a representation of connections between a group priority for a respective time period and one or more group priorities for a subsequent time period or one or more individual entity priorities, or a representation of connections between an individual entity priority and one or more execution elements; and mapping an amount of human energy associated with the group priorities or the individual entity priorities by providing one or more graphical representations of an amount of resources associated with the group priorities or the individual entity priorities based on the indications of status.

In some embodiments, the method may further comprise defining connections between one or more execution elements and one or more individual entity priorities; defining connections between one or more individual entity priorities and one or more group priorities in a same time period; and defining connections between one or more group priorities in a respective time period and one or more group priorities in a subsequent time period.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4B:
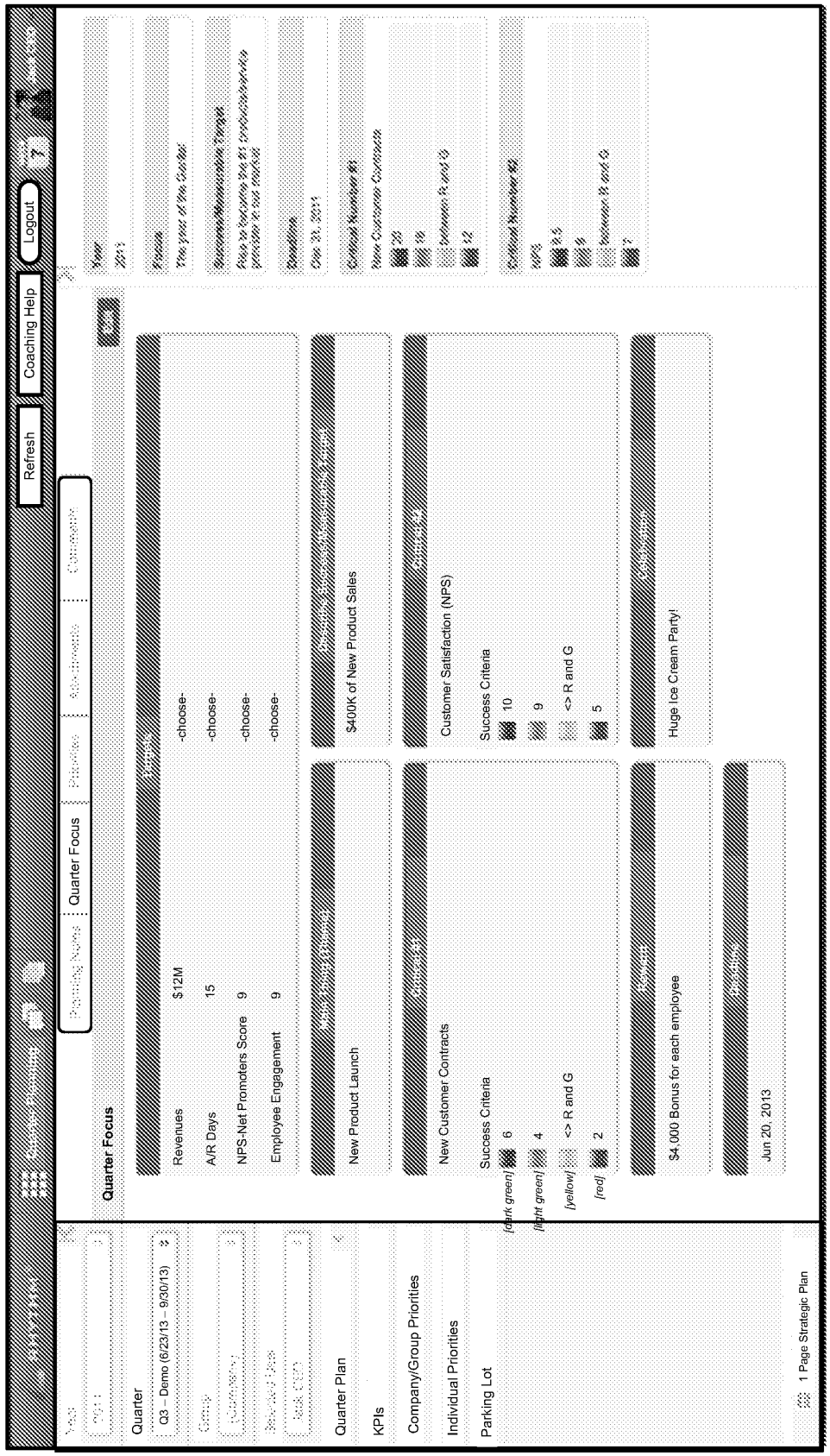
Figure 4C:
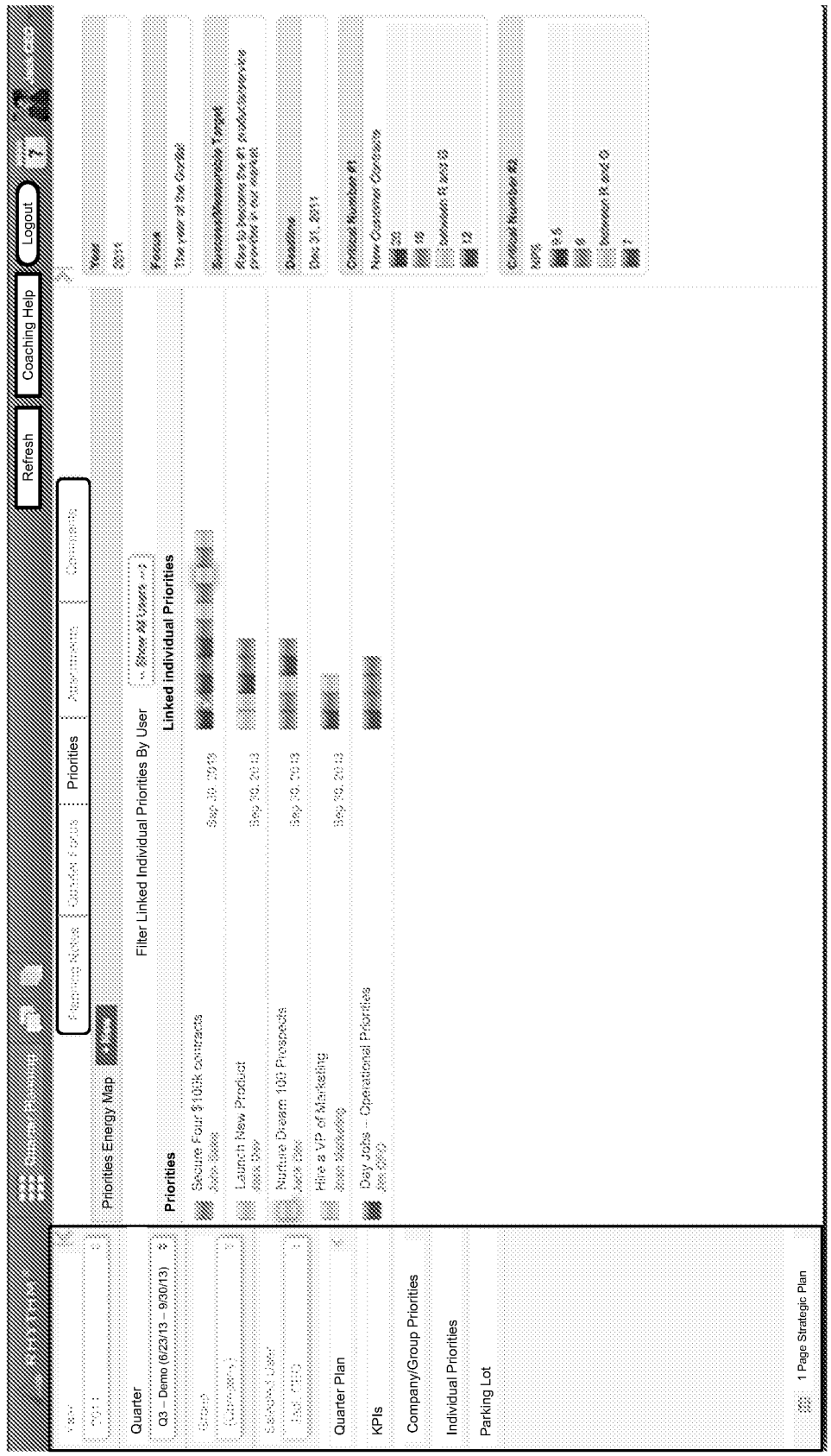
Figure 5B:
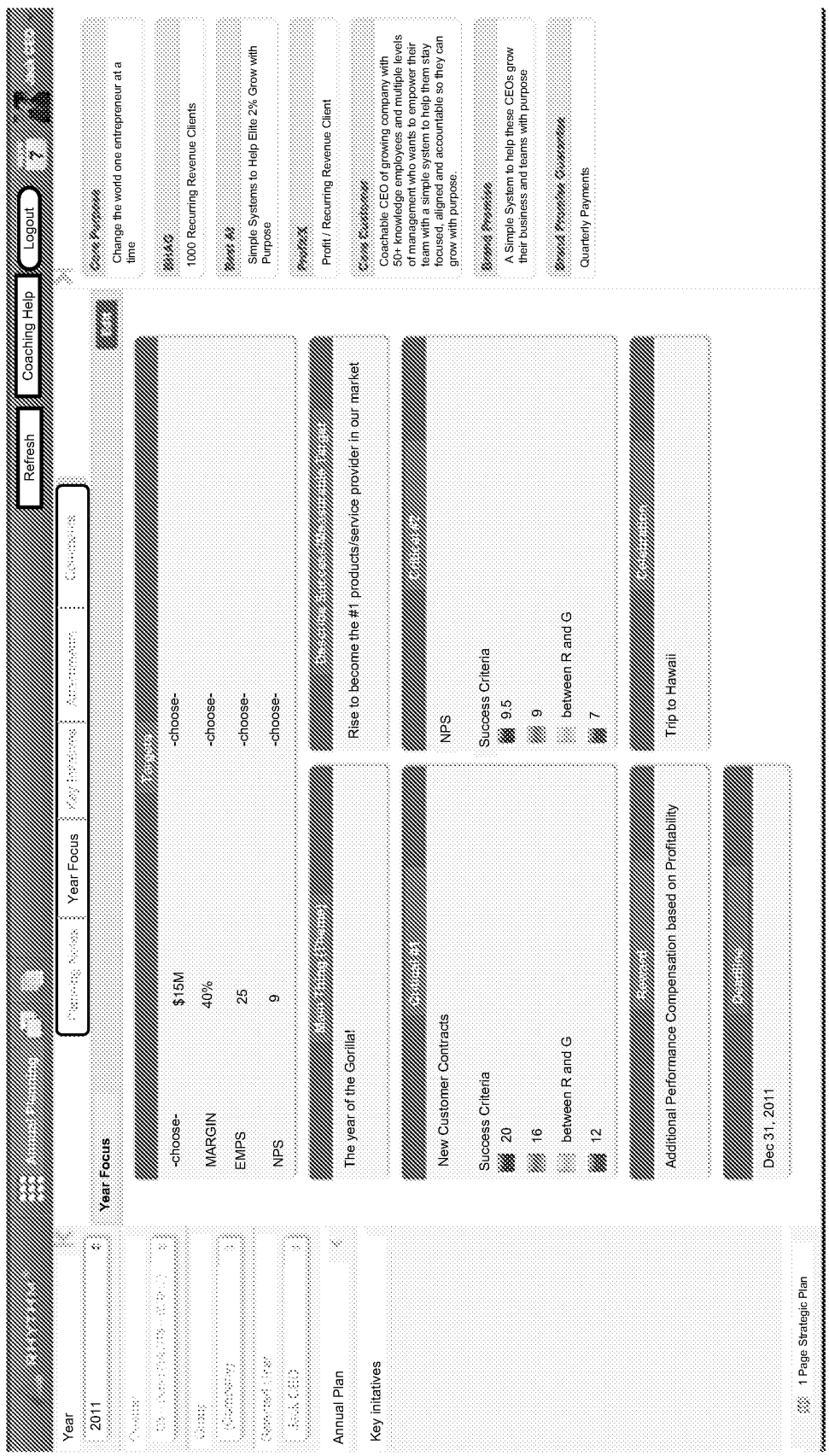
Figure 6B:
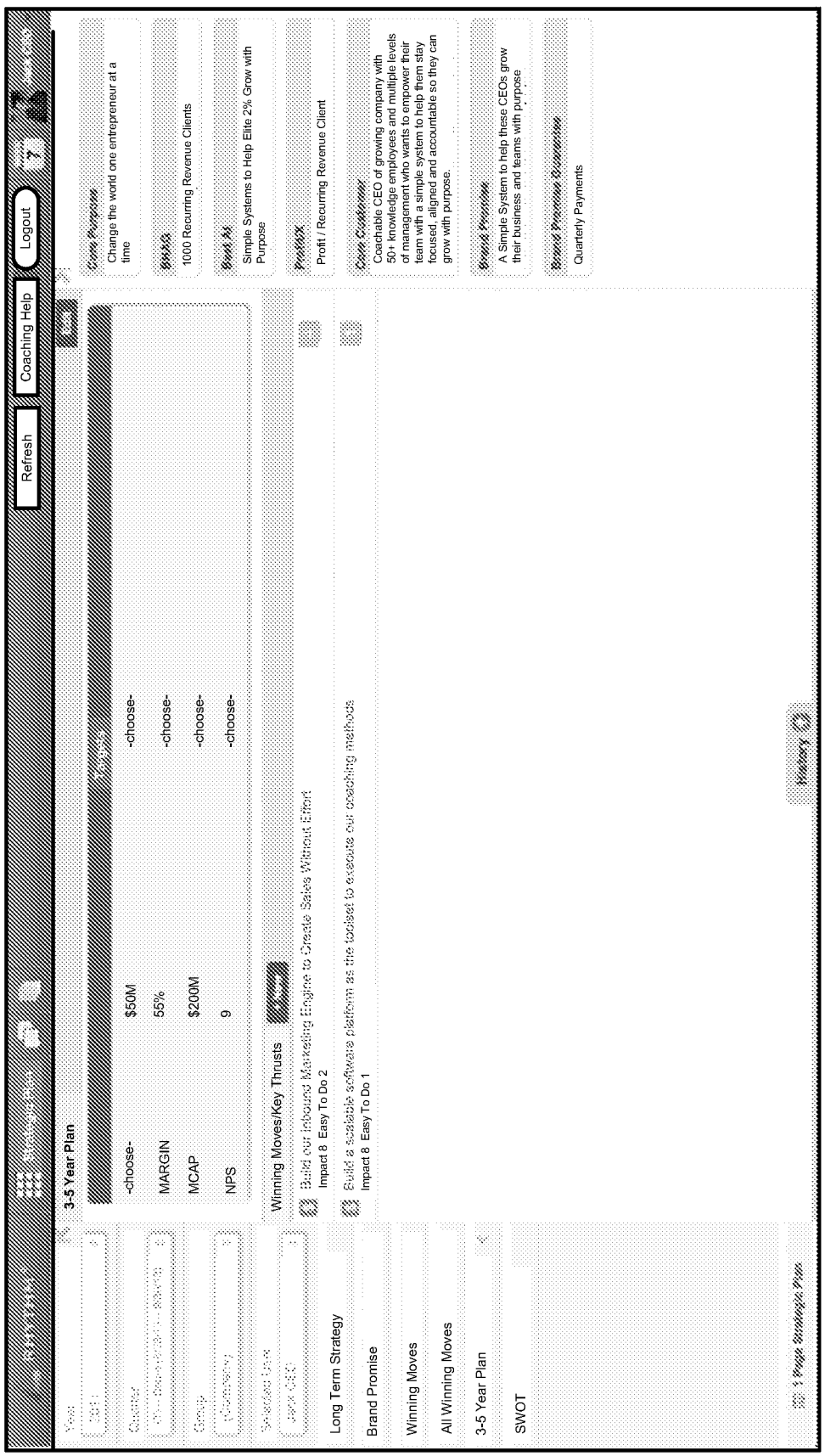
Figure 9A:
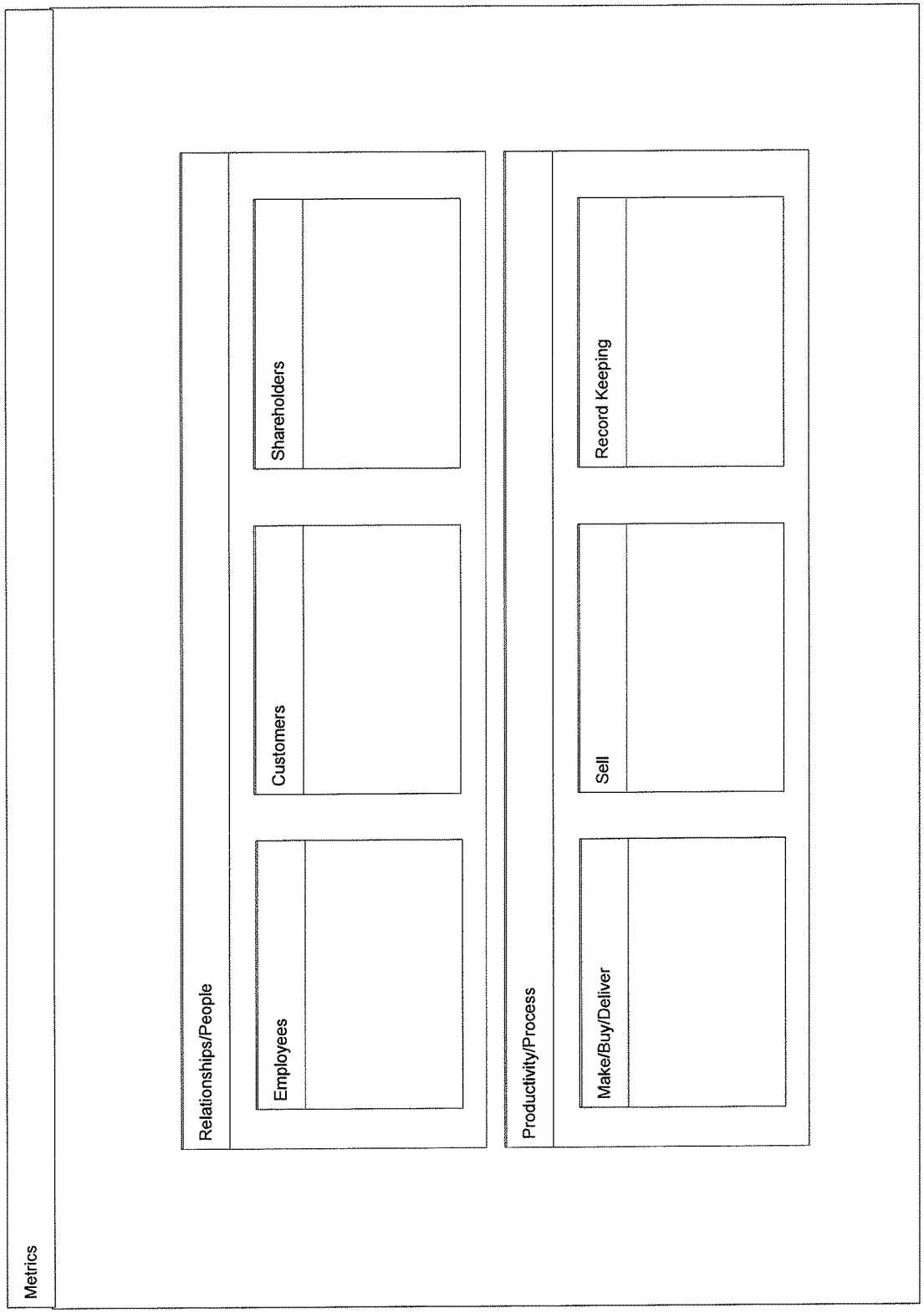
Figure 9B:
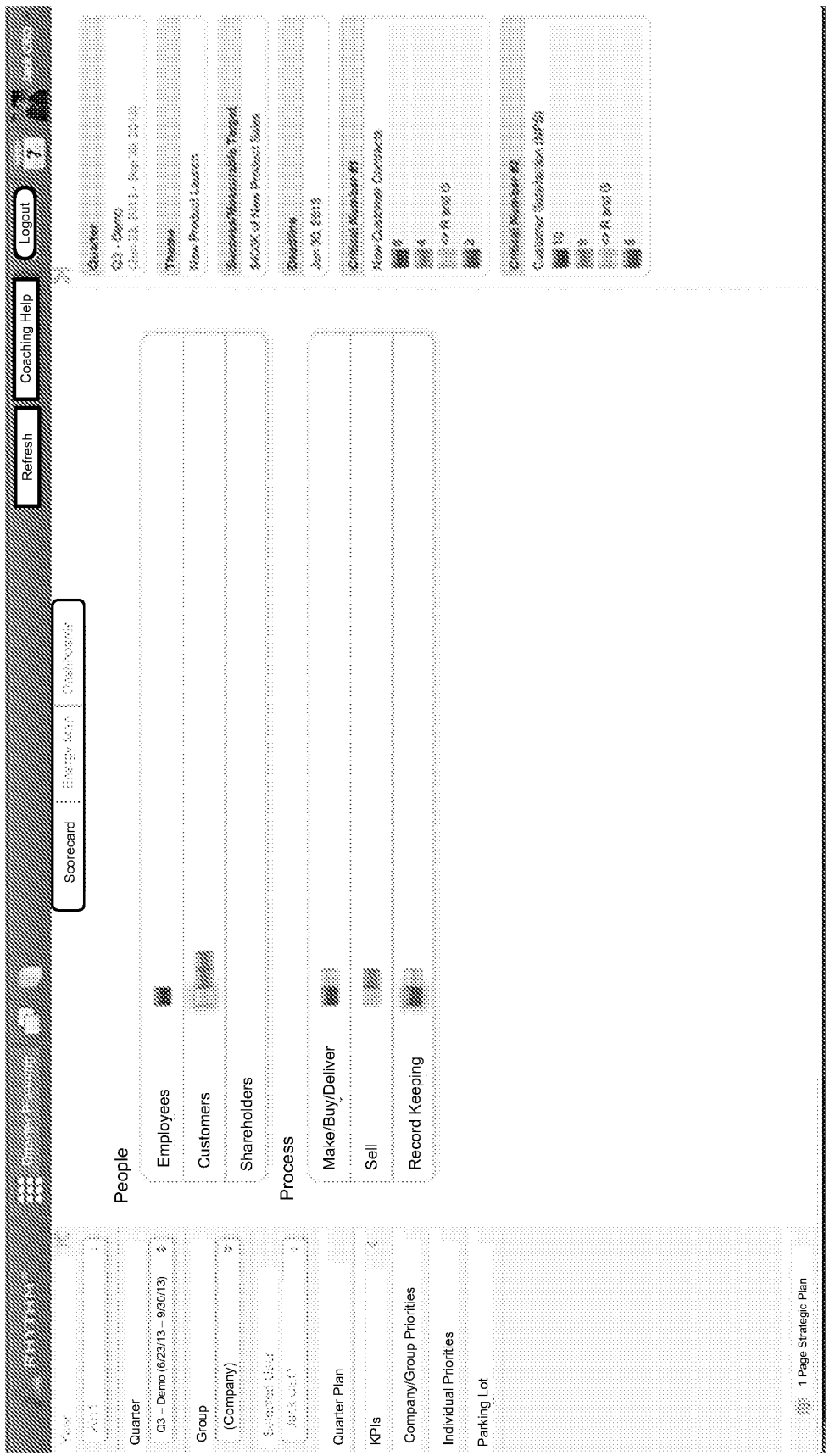
Figure 10A:
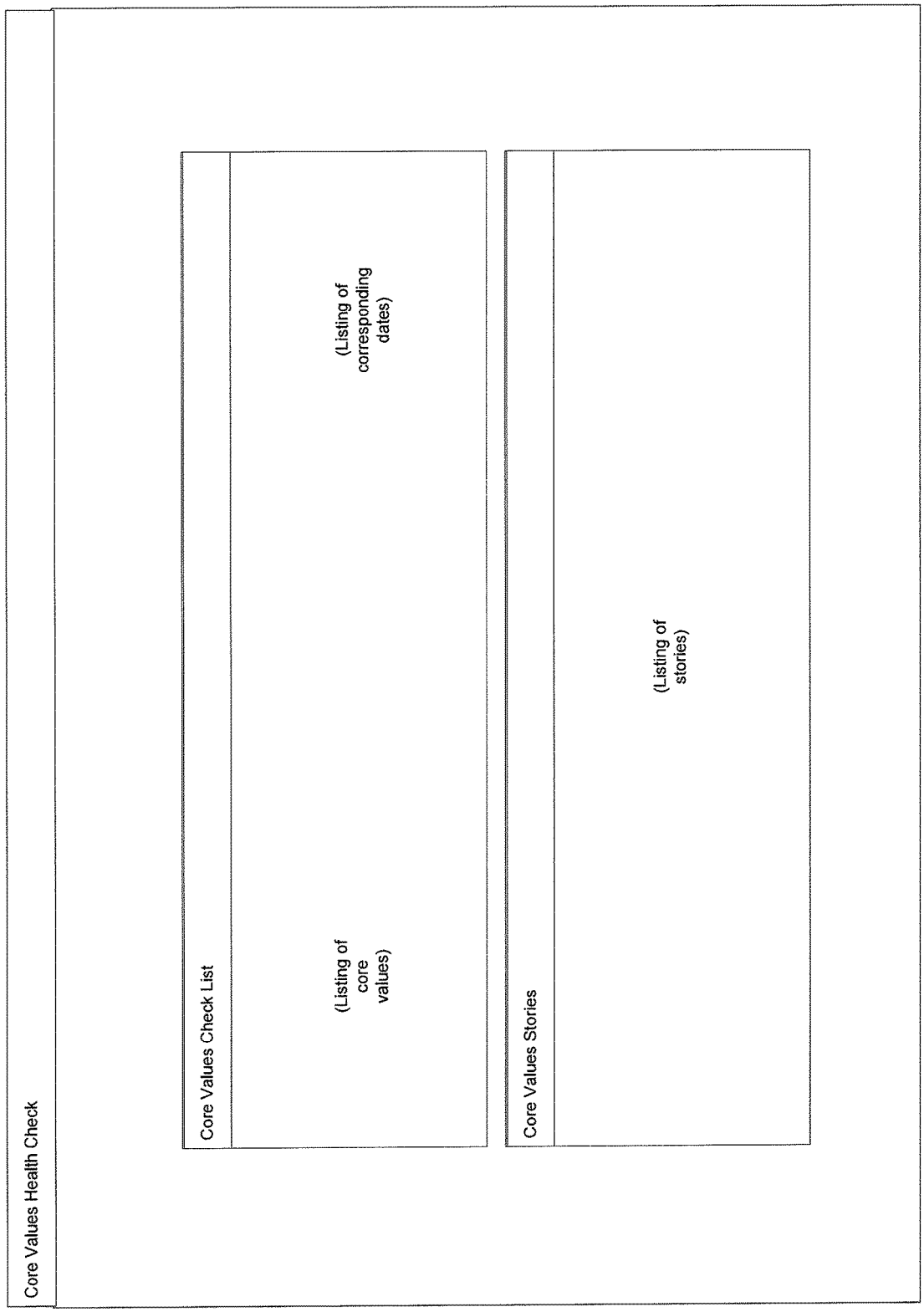
Figure 10B:
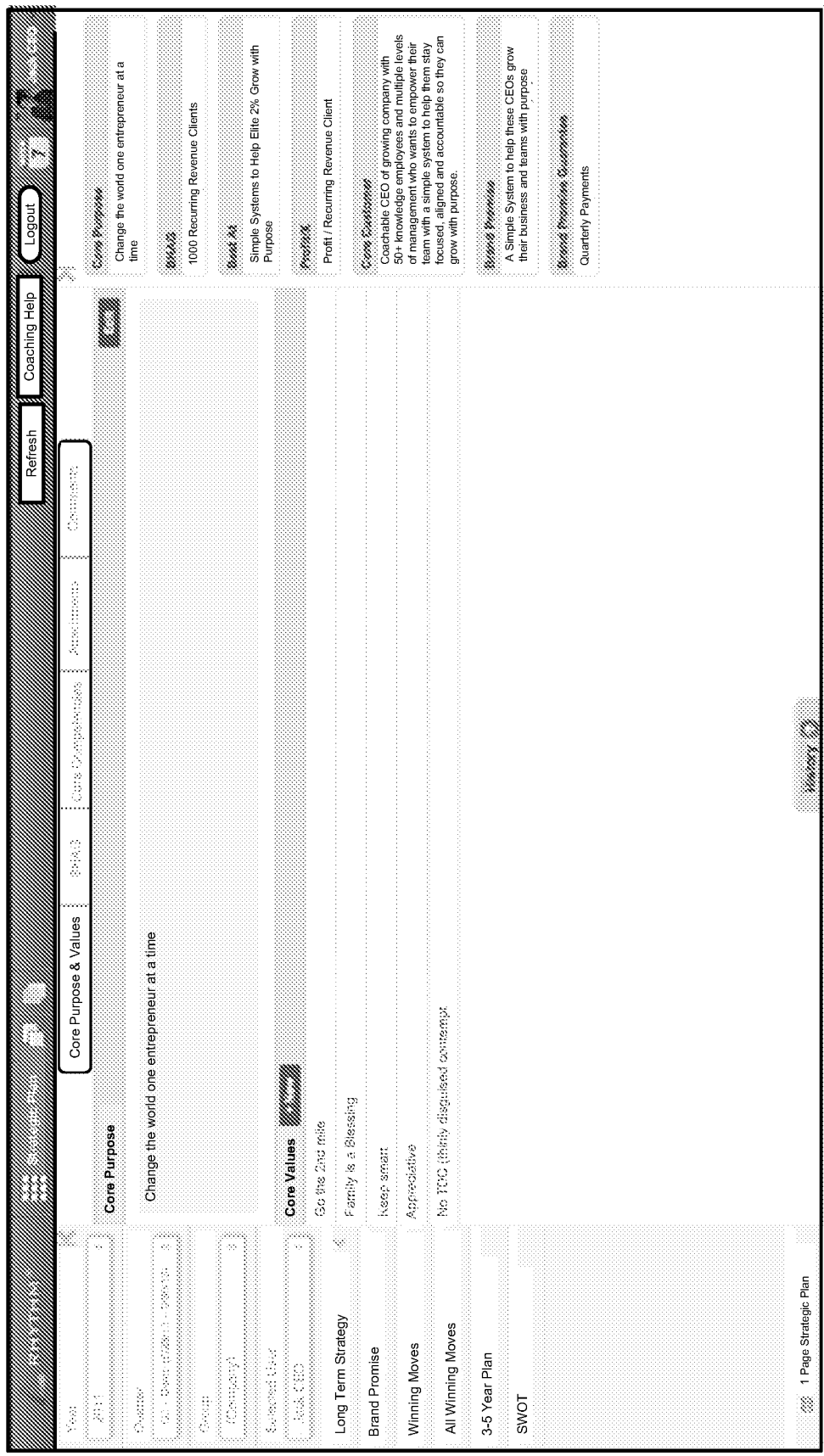
Figure 11:
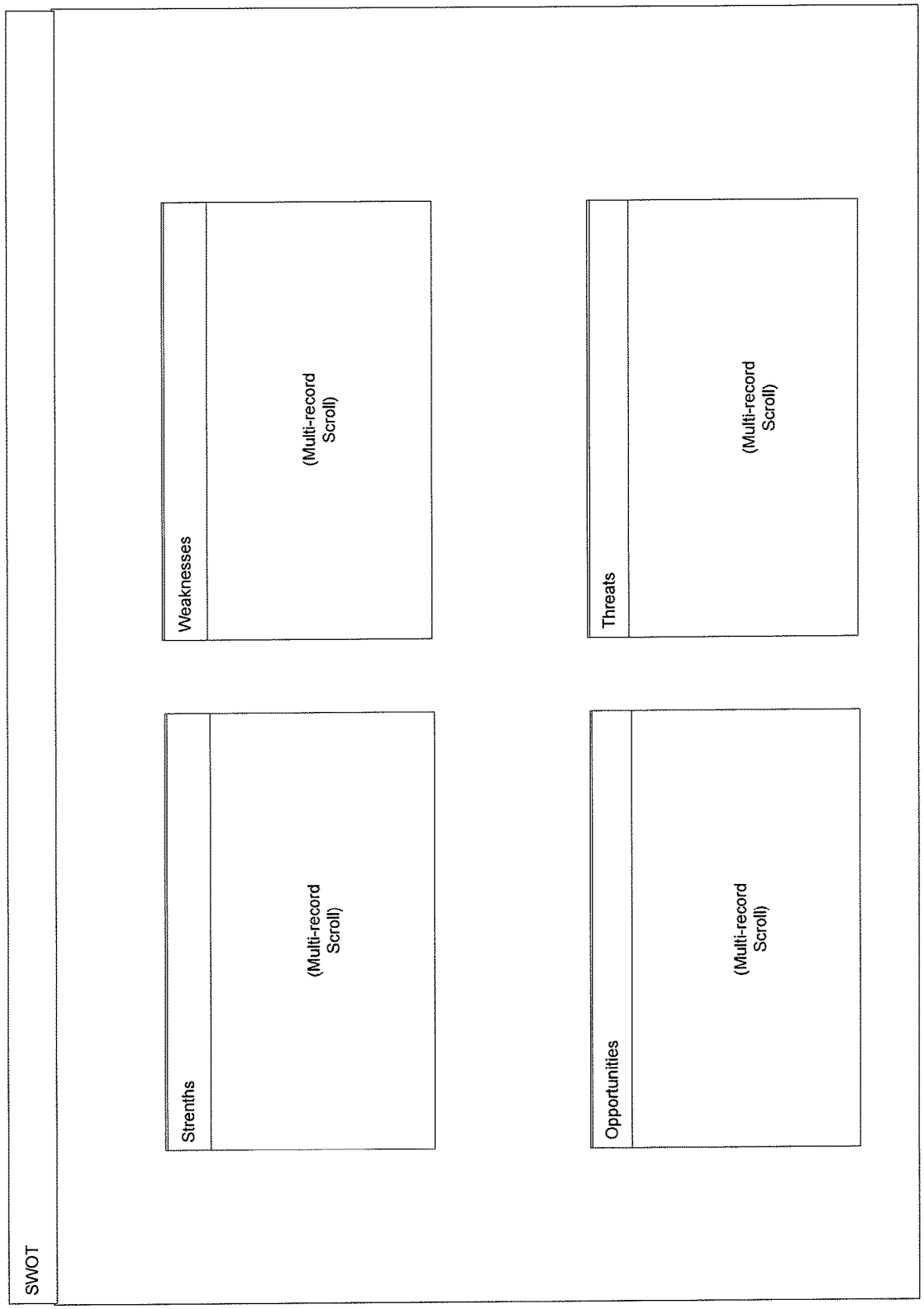
Figure 12A:
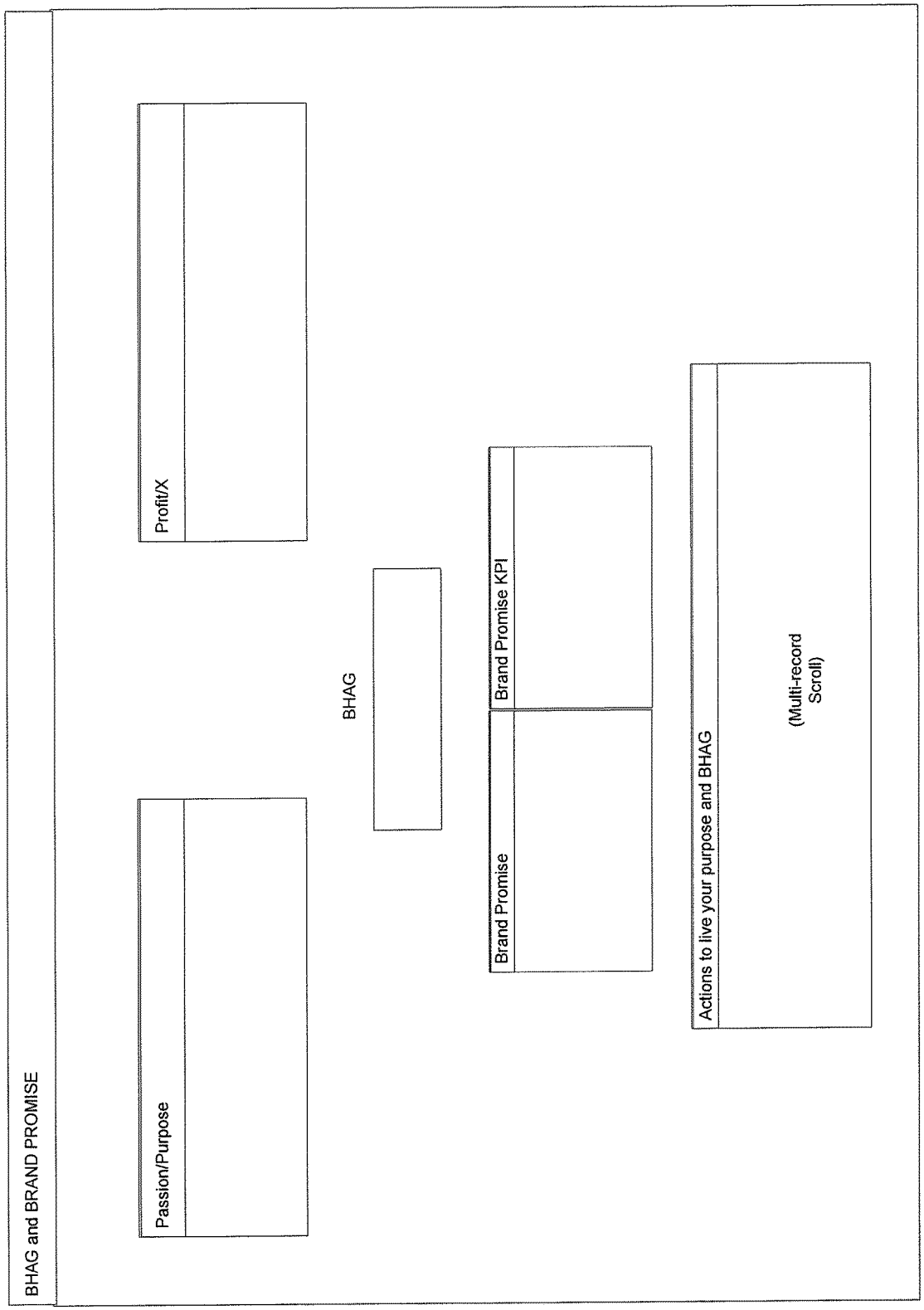
Figure 12B:
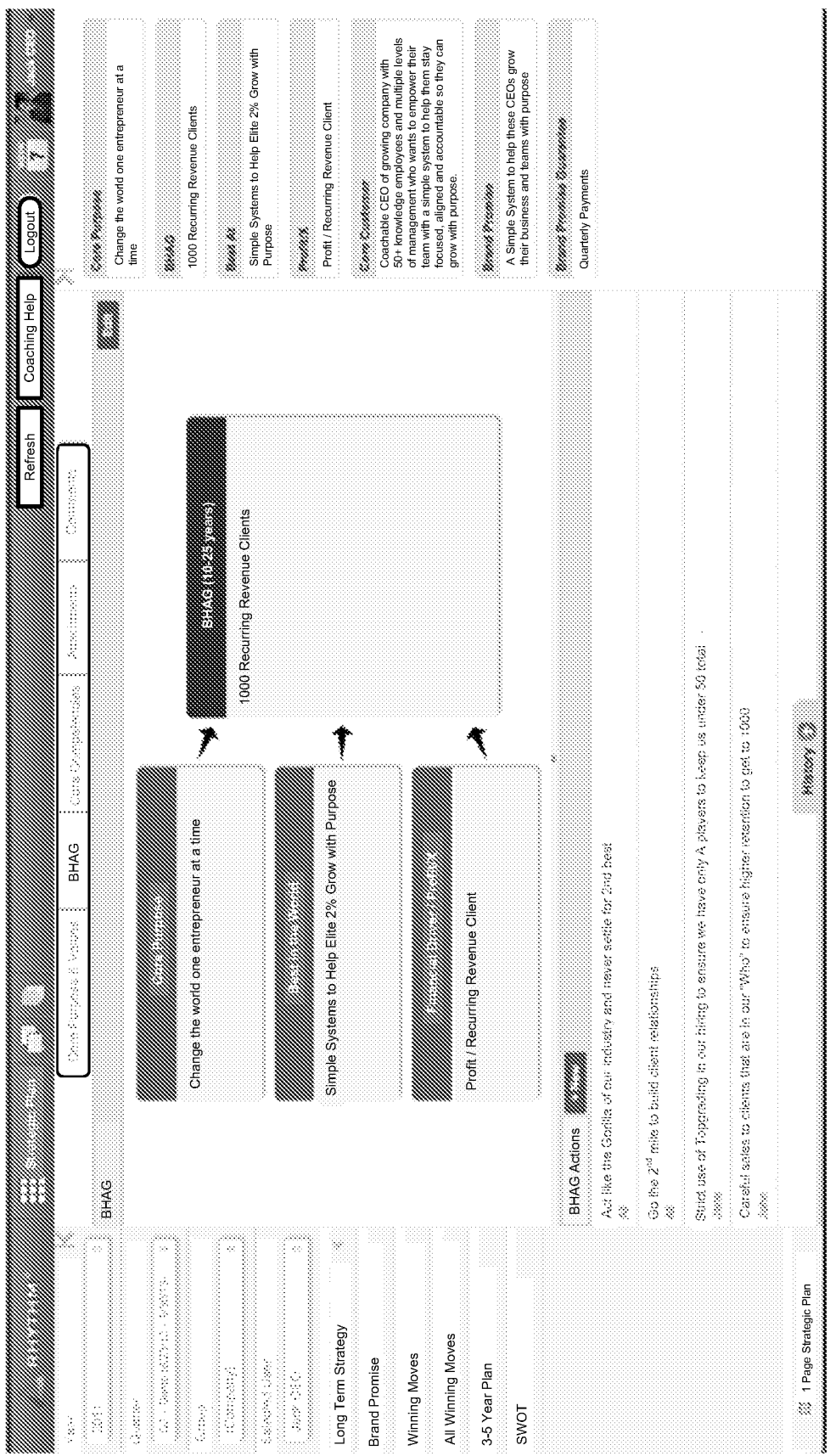
Figure 12C:
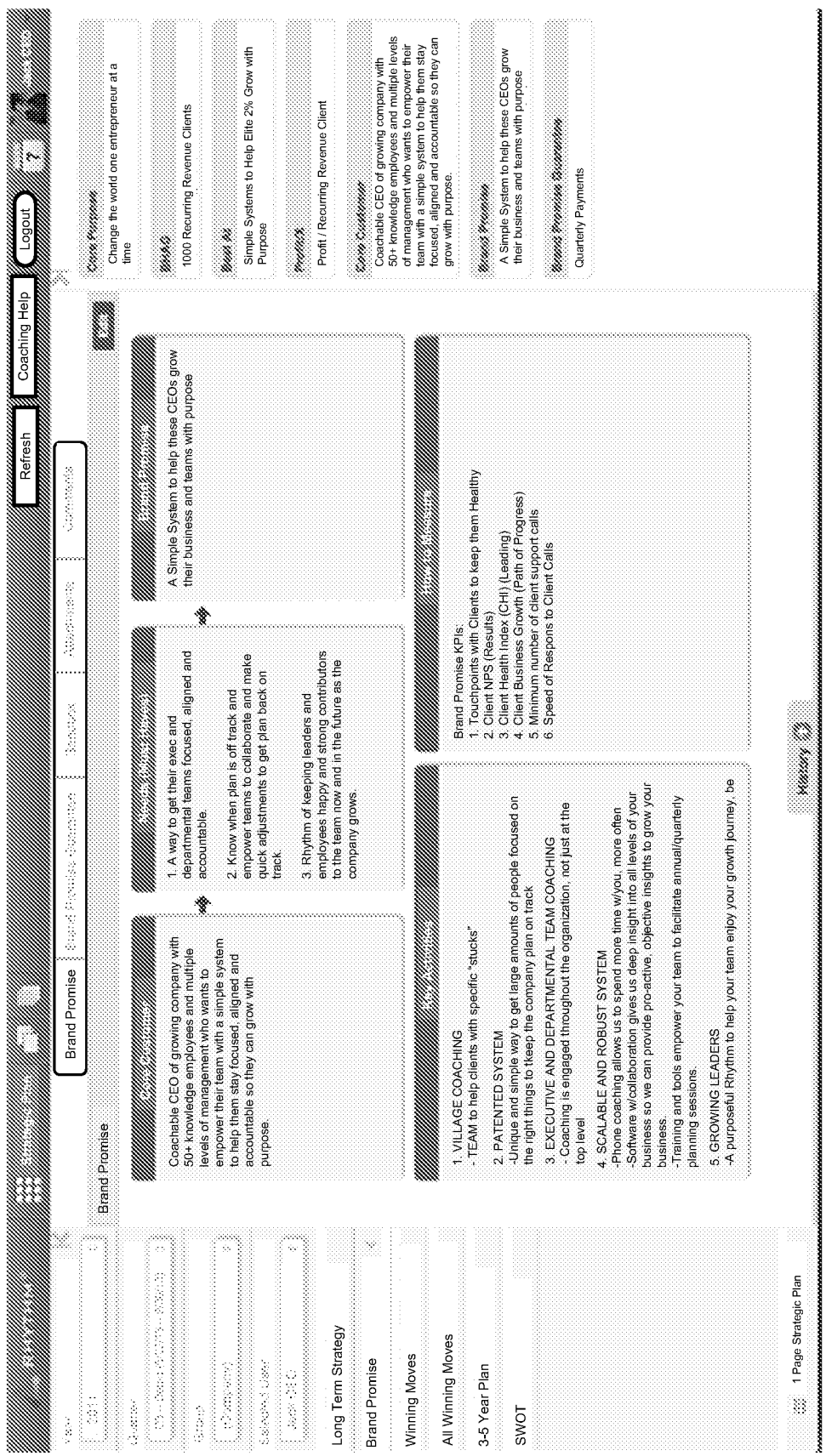
Figure 12D:
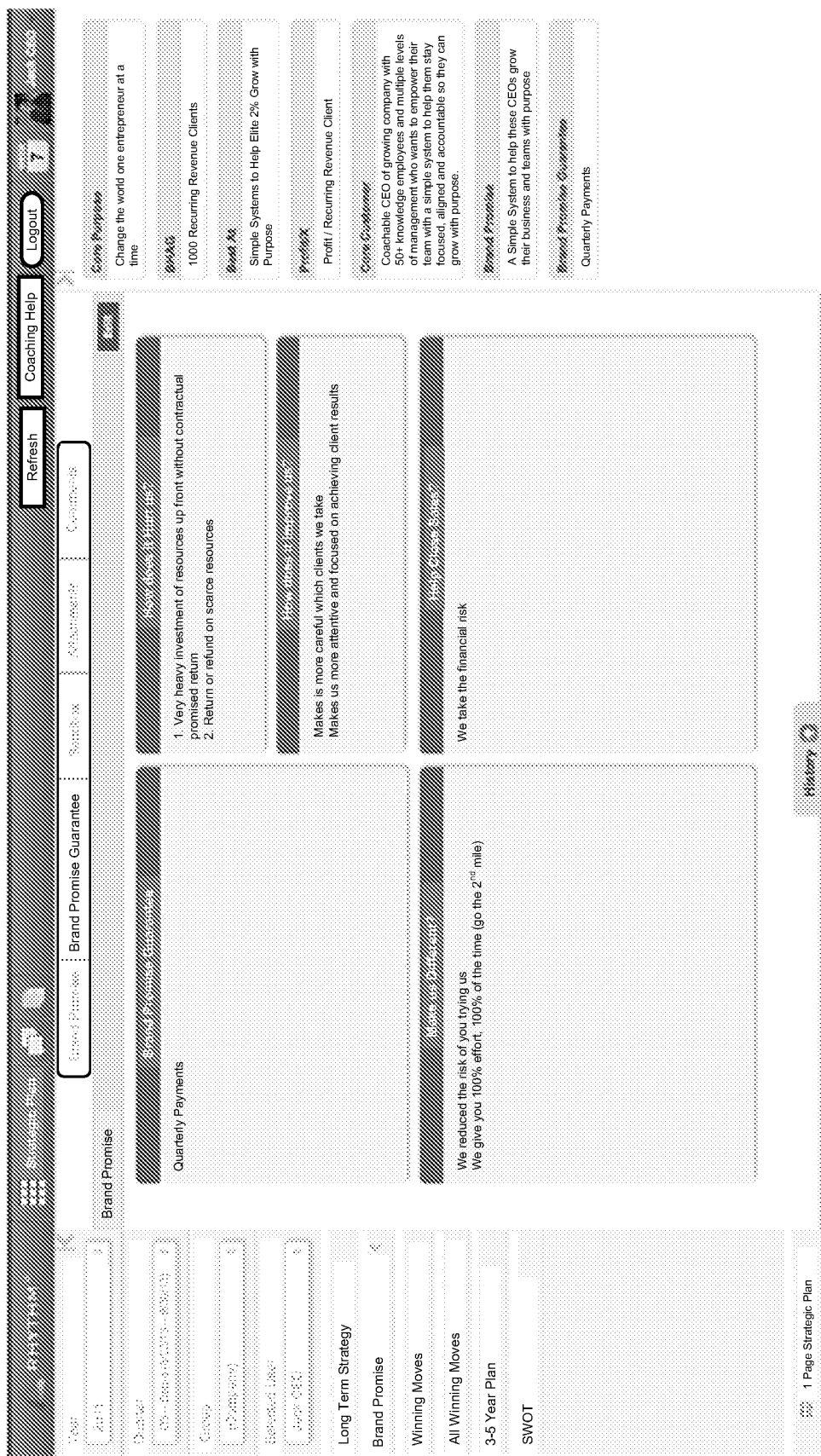
Figure 12E:
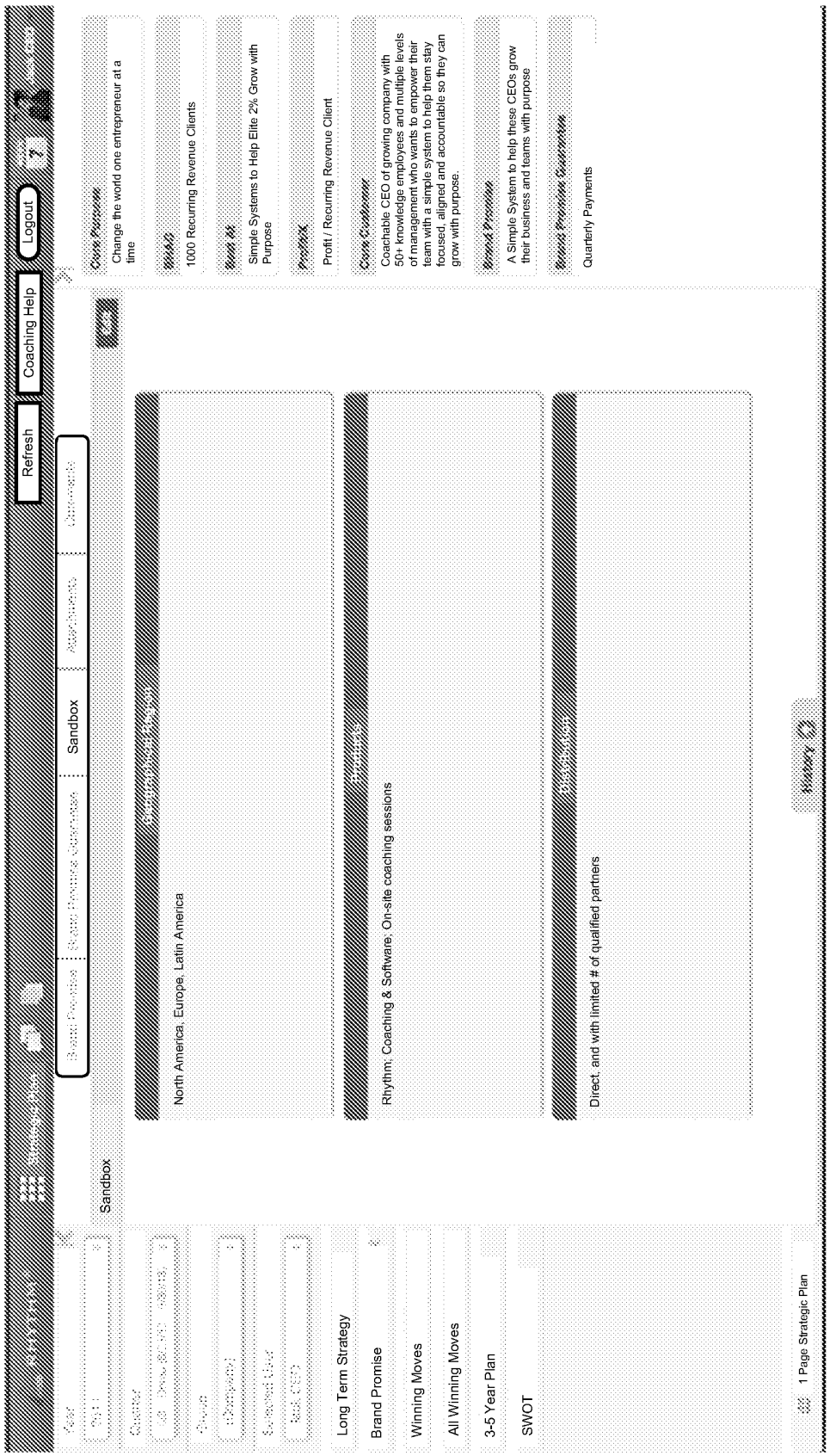
Figure 14B:
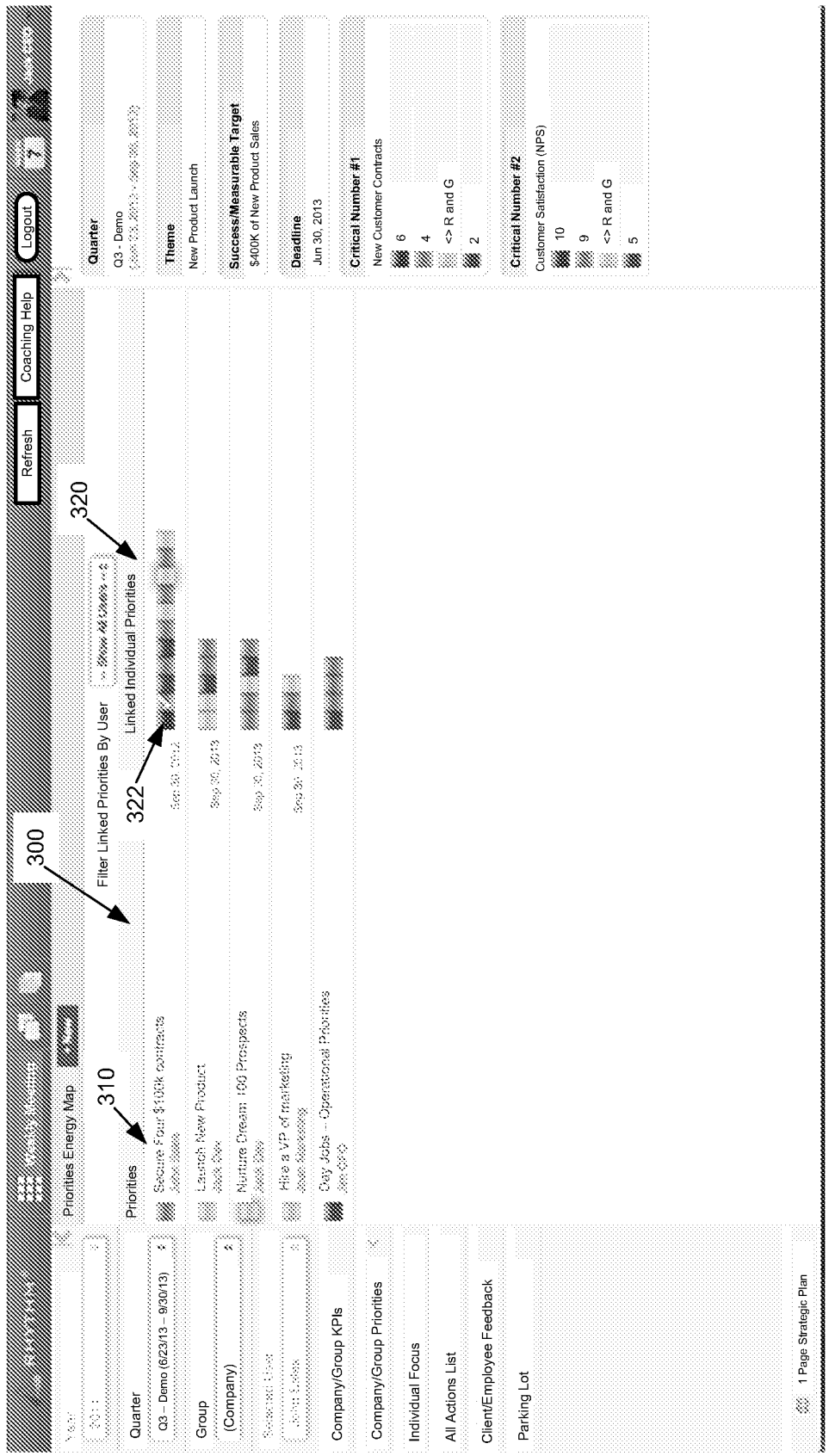
Figure 14C:
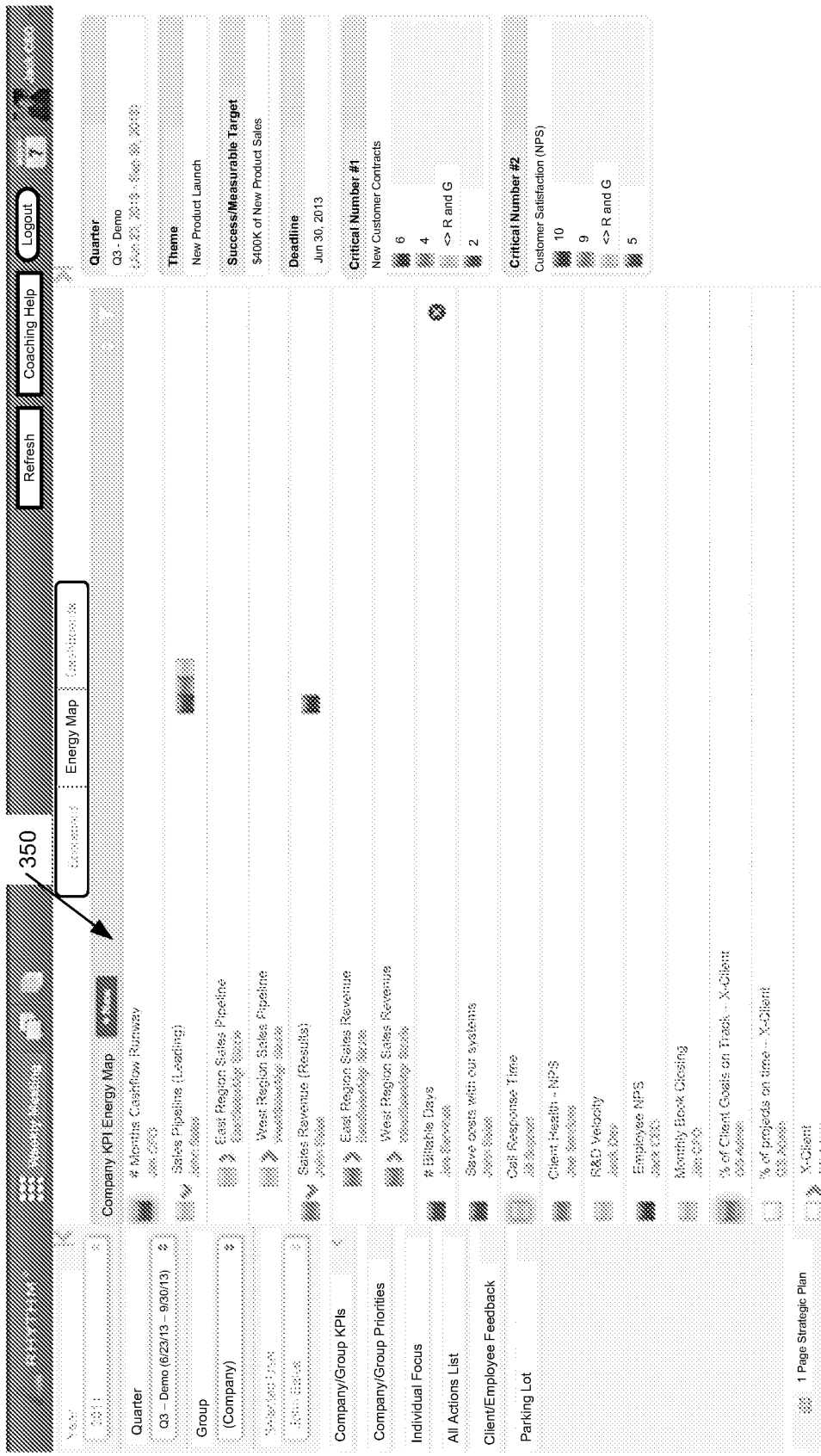
Figure 15:
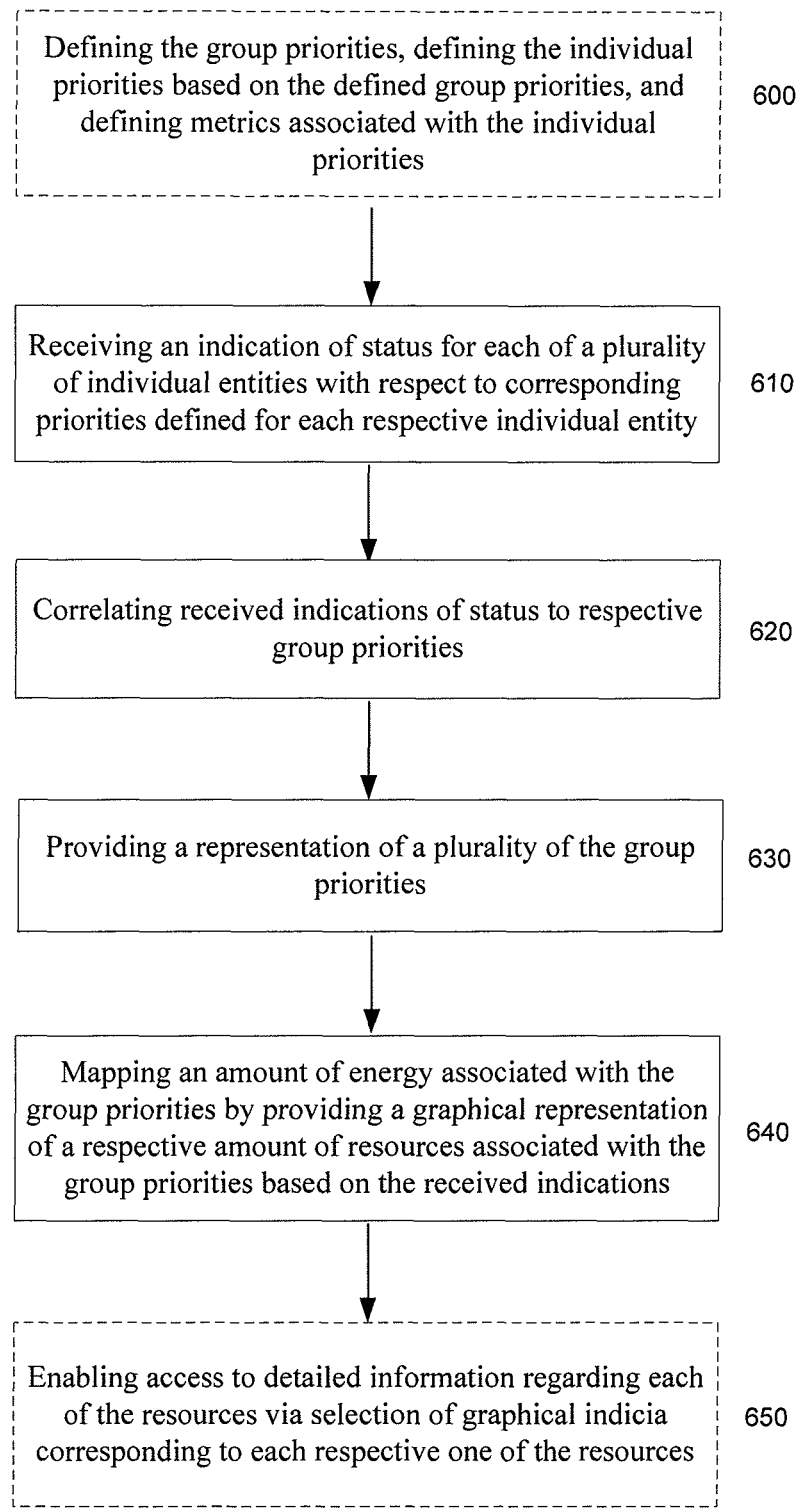
Figure 16:
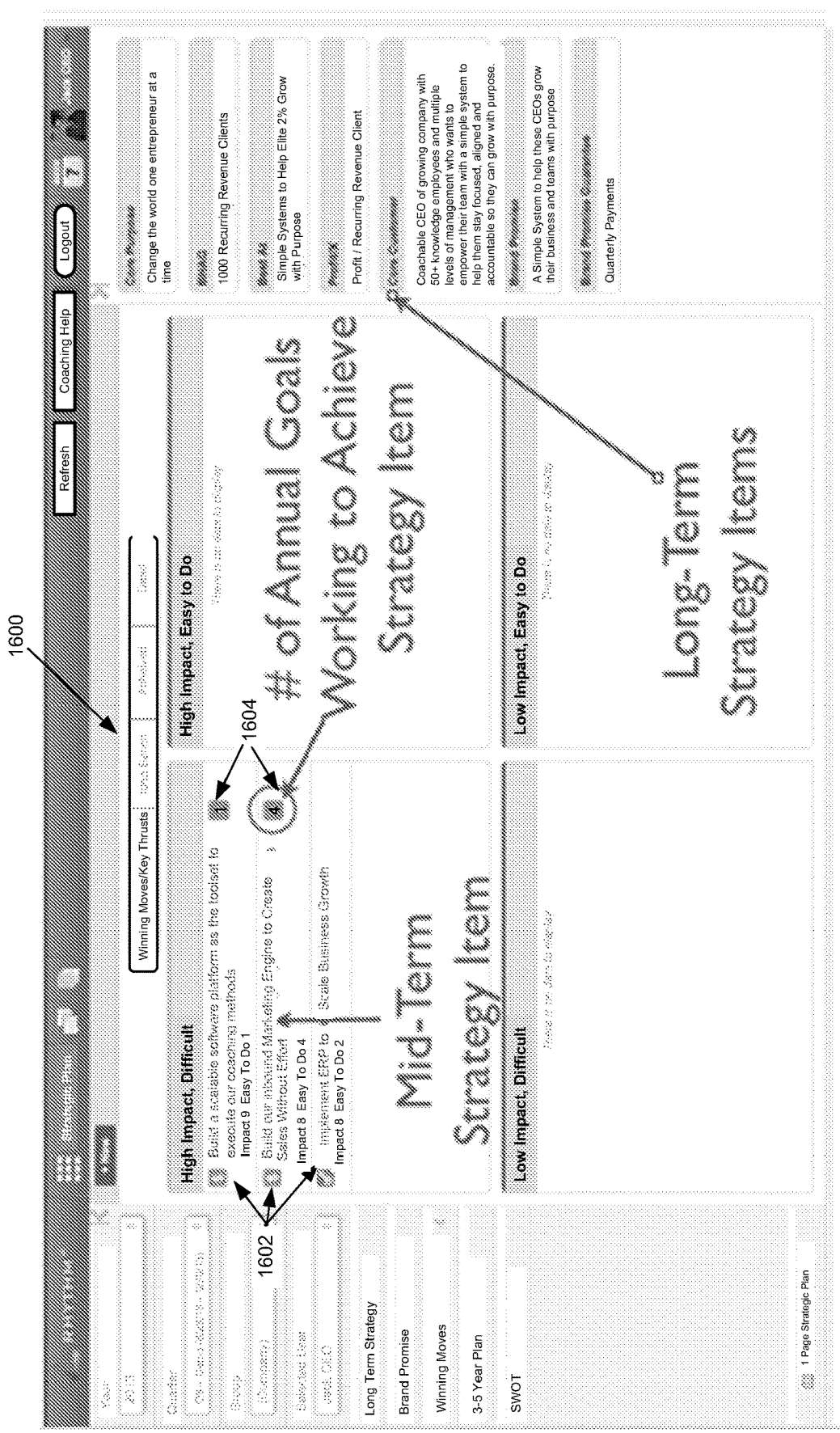
Figure 17:
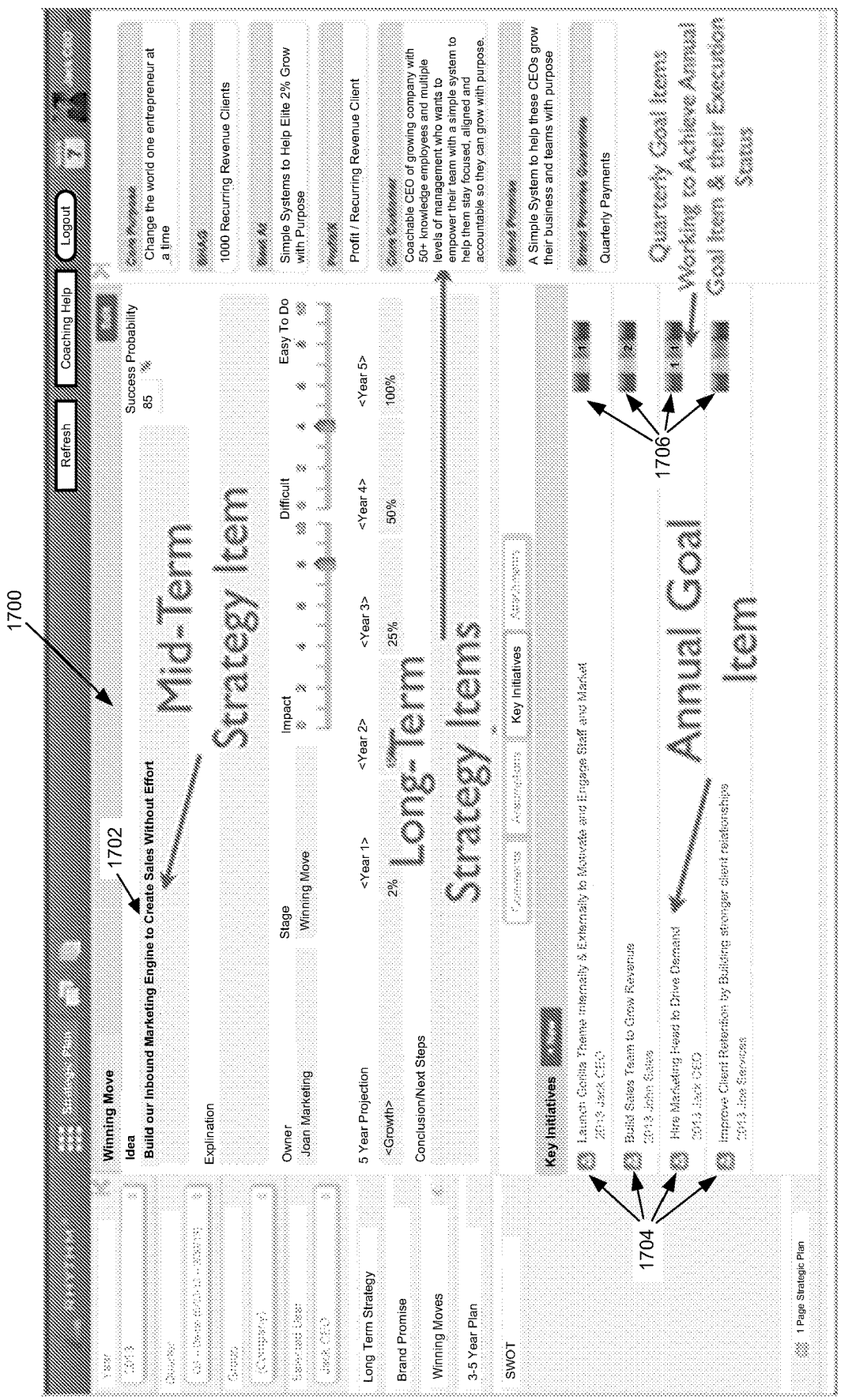
Figure 18:
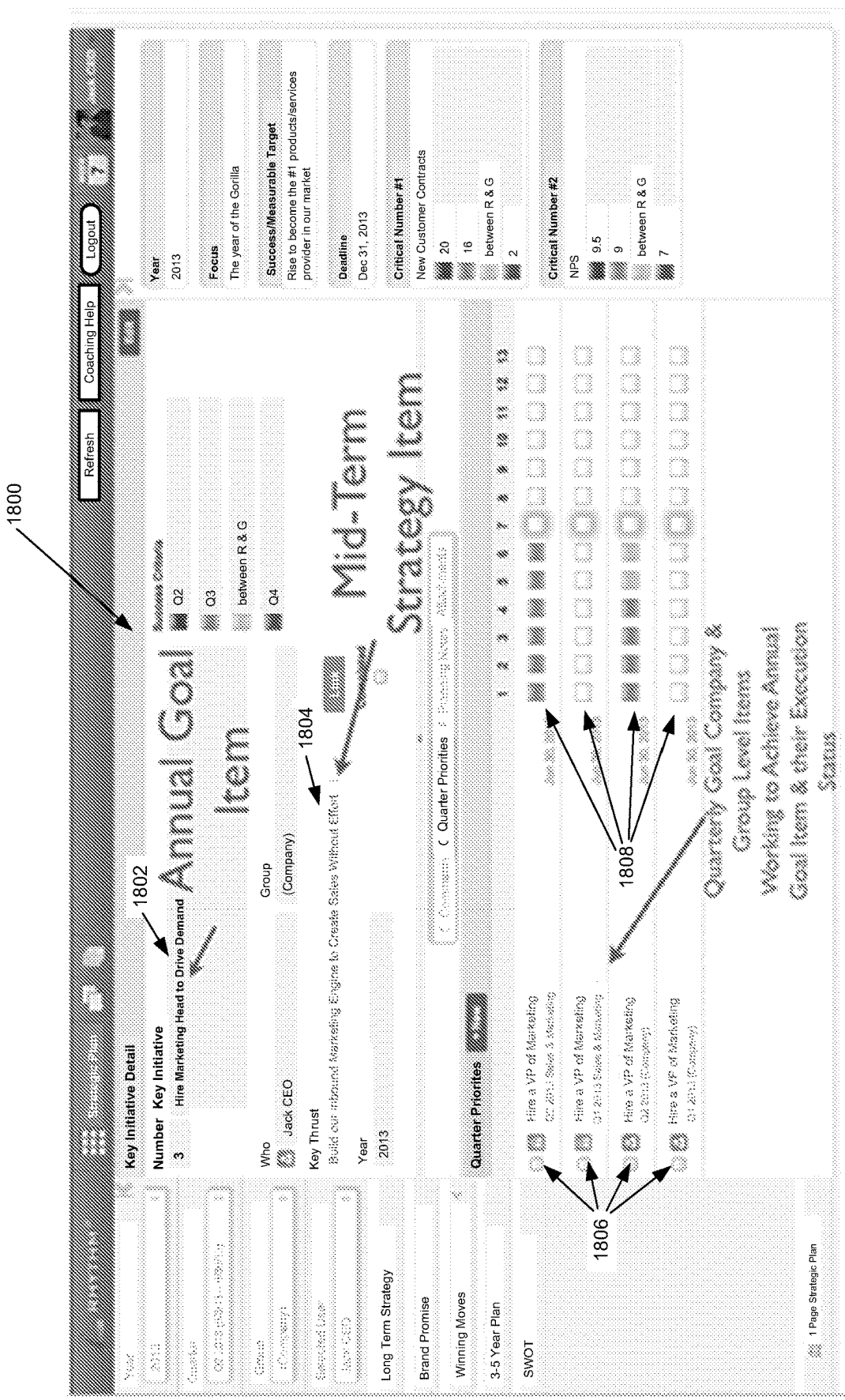
Figure 19:
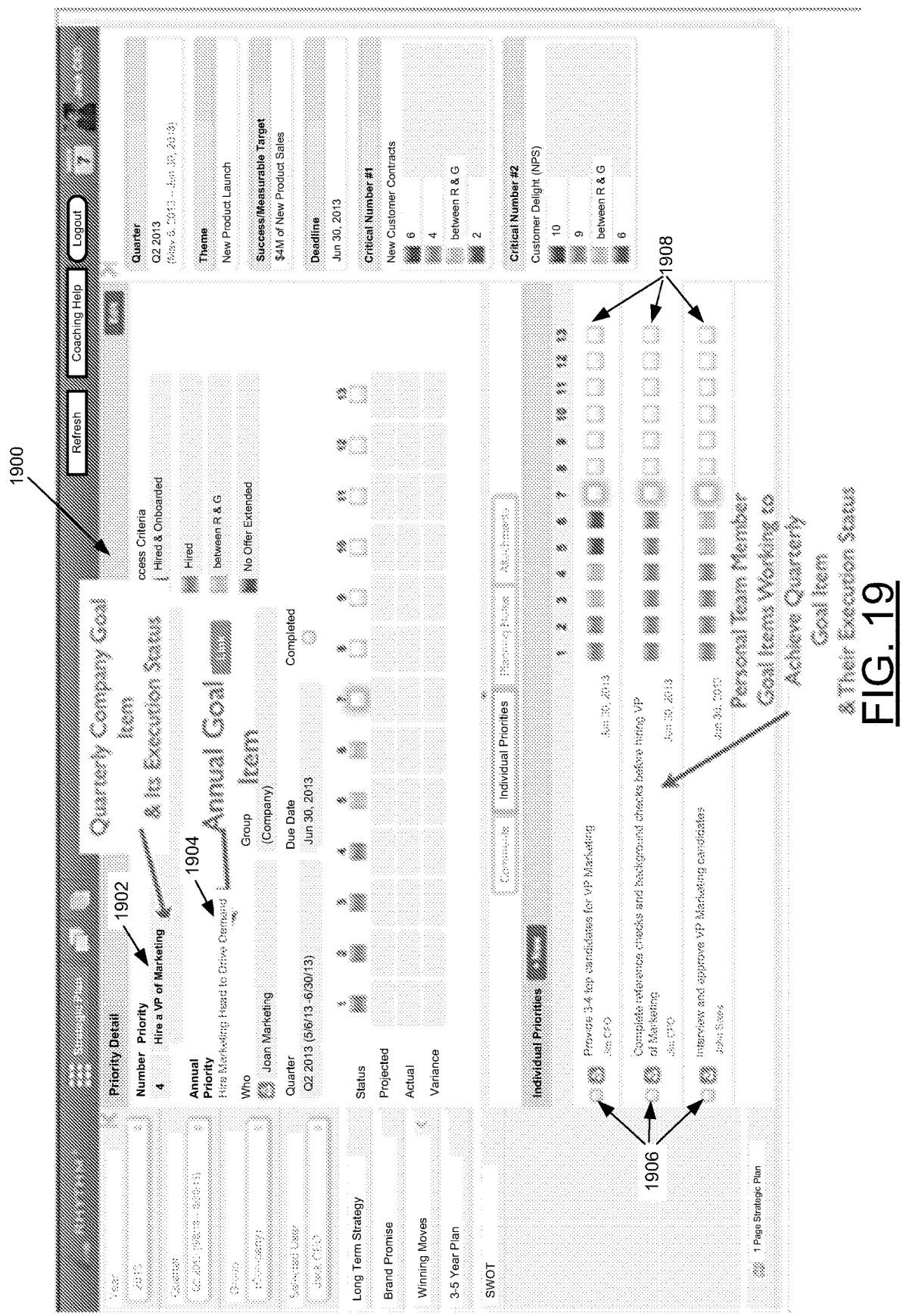
Figure 20:
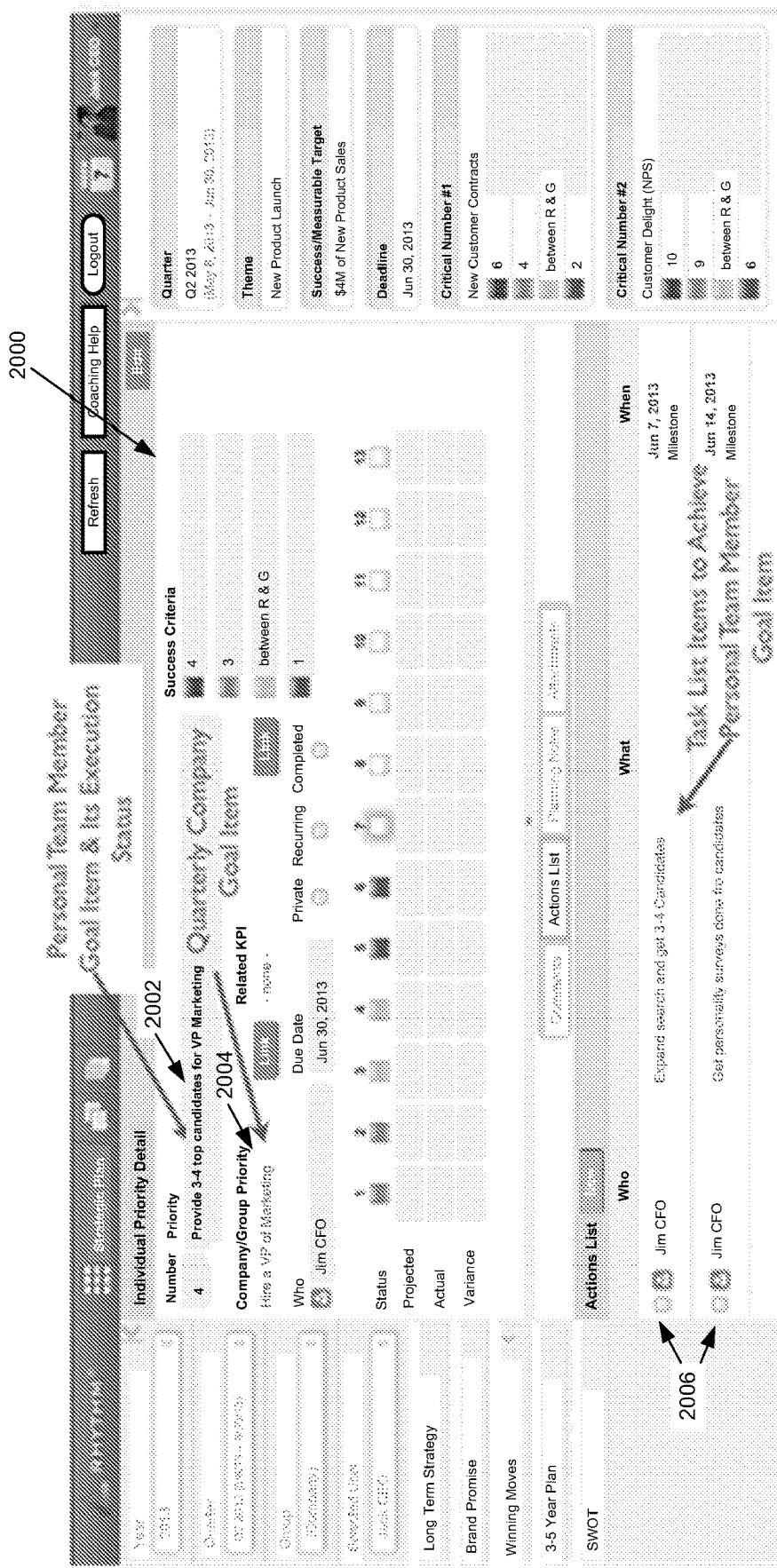

FIGS. 4*a-c* illustrate an exemplary display of an interface for providing information related to quarterly planning according to an exemplary embodiment of the present invention;

FIGS. 5*a-c* illustrate an exemplary display of an interface for providing information related to yearly planning according to an exemplary embodiment of the present invention;

FIGS. 6*a-b* show a display of an interface for providing information related to three to five year planning according to an exemplary embodiment of the present invention;

FIG. 7 illustrates an example of an interface page that may be used to define information regarding yearly planning according to an exemplary embodiment of the present invention;

FIG. 8 illustrates an example of an interface page that may be used to define information regarding quarterly planning according to an exemplary embodiment of the present invention;

FIGS. 9*a-b* illustrate an exemplary display in which metric related information may be provided according to an exemplary embodiment of the present invention;

FIGS. 10*a-b* illustrates an example of a core values health check page according to an exemplary embodiment of the present invention;

FIG. 11 illustrates a display of a page for defining strengths, weaknesses, opportunities and/or threats according to an exemplary embodiment of the present invention;

FIGS. 12*a-e* illustrate a display for a page for providing or accessing other information that may be applicable to priority definition according to an exemplary embodiment of the present invention;

FIGS. 13*a-d* illustrate an exemplary executive dashboard display according to an exemplary embodiment of the present invention;

FIGS. 14*a-c* illustrate a display of an energy map for an exemplary executive dashboard display according to an exemplary embodiment of the present invention;

FIG. 15 is a flowchart according to an exemplary method of providing an energy map according to one embodiment of the present invention;

FIG. 16 illustrates an exemplary display interface for providing connections between strategy items and annual goals according to an exemplary embodiment of the present invention;

FIG. 17 illustrates an exemplary display interface for providing connections between strategy items and annual goals according to an exemplary embodiment of the present invention;

FIG. 18 illustrates an exemplary display interface for providing connections between quarterly company/group goals and annual goals according to an exemplary embodiment of the present invention;

FIG. 19 illustrates an exemplary display interface for providing connections between quarterly individual goals and quarterly company/group goals according to an exemplary embodiment of the present invention; and FIG. 20 illustrates an exemplary display interface for providing connections between task/action items and quarterly individual goals according to an exemplary embodiment of the present invention.

DETAILED DESCRIPTION OF THE INVENTION

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout.

Embodiments of the present invention may provide a mechanism for defining company priorities at various different levels and also for various different time periods. The defined priorities may correspond to events, tasks, projects, goals, milestones, or various other mechanisms for measuring progress or status. In some cases, a single priority may include a plurality of different events or tasks associated with achieving completion of an overall priority, event or task. Given the flexibility provided by exemplary embodiments with respect to level and time period applicability, short term, intermediate, and long term goals or priorities may be effectively defined and/or tracked in an efficient manner. A system for providing and managing the information associated with exemplary embodiments as well as some examples of devices for providing and managing such information will be described below. Moreover, several user interface options or examples for enabling the definition of and/or tracking of priorities at the various levels and/or time periods will be described below in order to illustrate one exemplary embodiment.

Figure 1:
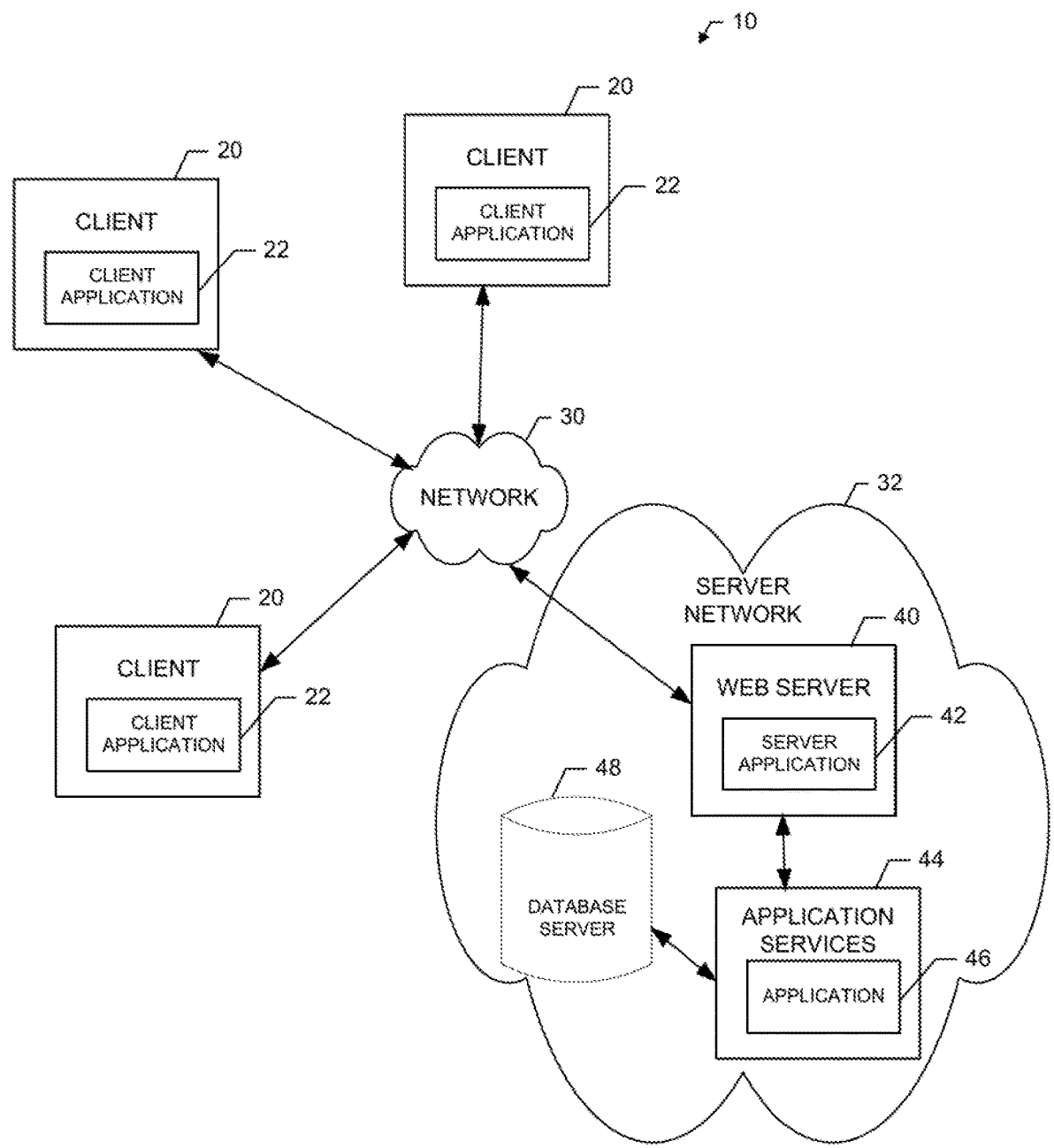
FIG. 1 is a basic block diagram illustrating a system for providing intra-company communication according to an exemplary embodiment of the present invention.

FIG. 1 is a basic block diagram illustrating a system 10 for providing intra-company communication according to an exemplary embodiment. It should be noted that while FIG. 1 and other figures will be described mainly in the context of executive management teams, embodiments of the present invention are not limited to applications related to executive management teams, but could be practiced with many other companies or organizations of varying sizes. For example, management of teams, businesses, faculty, staff, employees or organizations of different levels of sophistication could also be practiced in connection with some embodiments. Thus, the description of executive management team information and the corresponding system and component descriptions that follow should be understood to be exemplary of one system for employing one exemplary embodiment of the present invention and should not be treated as limiting with respect to other systems that may utilize embodiments of the present invention. Many types of information may also be managed by embodiments of the present invention including, but not limited to those mentioned herein.

As shown in FIG. 1, the system 10 may include one or more clients 20 that may, in some cases, be associated with different corresponding executive team members or business units of a company. For example, one client 20 may be associated with a first business unit or company executive and a second client 20 may be associated with a second business unit or company executive. However, multiple executives or business units may alternatively use or be associated with a single client. The business units or executives may be geographically collocated or remote from each other.

Each client 20 may be, for example, a computer (e.g., a personal computer, laptop computer, network access terminal, or the like) or may be another form of computing device (e.g., a personal digital assistant (PDA), cellular phone, or the like) capable of communication with a network 30. As such, for example, each client 20 may include (or otherwise have access to) memory for storing instructions or applications for the performance of various functions and a corresponding processor for executing stored instructions or applications. Each client 20 may also include software and/or corresponding hardware for enabling the performance of the respective functions of the clients as described below. In an exemplary embodiment, one or more of the clients 20 may include a client application 22 configured to operate in accordance with an exemplary embodiment of the present invention. In this regard, for example, the client application 22 may include software for enabling a respective one of the clients 20 to communicate with the network 30 for the provision of and receipt of information associated with providing an energy map. As such, for example, the client application 22 may include corresponding executable instructions for configuring the client 20 to provide corresponding functionalities for the provision of and receipt of information associated with providing an energy map as described in greater detail below. Moreover, in an exemplary embodiment, the client application 22 may include functionality for providing an executive dashboard including the energy map.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) or databases. Communication between the network 30, the clients 20 and the devices or databases (e.g., servers) to which the clients 20 are coupled may be accomplished by either wireline or wireless communication mechanisms and corresponding protocols.

In an exemplary embodiment, one of the devices to which the clients 20 may be coupled via the network 30 may include a web server 40, application services 44 and/or a database server 48, which together may form respective elements of a server network 32. The web server 40, the application services 44 and the database server 48 may each include hardware and/or software for configuring the web server 40, the application services 44 and the database server 48, respectively, to perform various functions. As such, for example, the web server 40 may include processing logic and memory enabling the web server 40 to access and/or execute stored computer readable instructions for performing various functions. In an exemplary embodiment, one function that may be provided by the web server 40 (and/or the application services 44) may be the provision of an energy map to the clients 20. Additionally or alternatively, the web server 40 (and/or the application services 44) may be configured to enable the clients 20 to provide information to the web server 40, for use by the web server 40 in producing, maintaining and/or supplying the energy map. In this regard, for example, the web server 40 may include or have access to memory (e.g., internal memory or the database server 48) for storing instructions or applications for the performance of various functions and a corresponding processor for executing stored instructions or applications. In an exemplary embodiment, the web server 40 may include a server application 42 configured to operate in accordance with an exemplary embodiment of the present invention. Additionally or alternatively, the application services 44 may include one or more applications 46 that may support functionality of the application services 44 and/or the web server 40 in accordance with exemplary embodiments. In this regard, for example, the server application 42 (or one or more of the applications 46) may include software for enabling the web server 40 (or the application services 44) to communicate with the network 30 and/or the clients 20 for the provision and/or receipt of information associated with providing an energy map. As such, for example, the server application 42 may include corresponding executable instructions for configuring the web server 40 to provide corresponding functionalities for the provision and/or receipt of information associated with providing an energy map as described in greater detail below. Furthermore, in an exemplary embodiment, the server application 42 (and/or the applications 46) may include functionality for providing an executive dashboard including the energy map.

Figure 2:
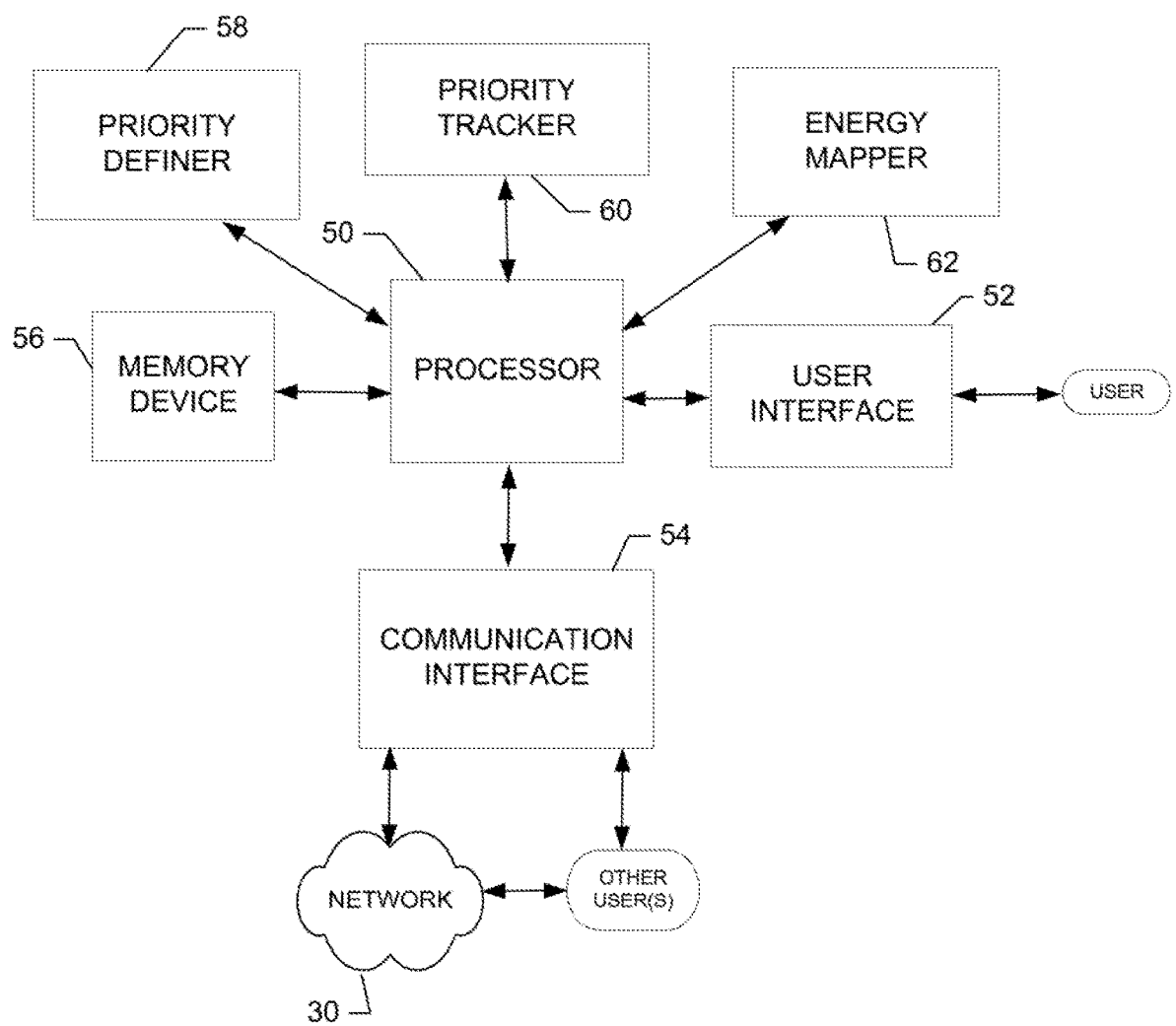
FIG. 2 is a basic block diagram of an apparatus for providing an energy map according to an exemplary embodiment of the present invention.
Figure 3:
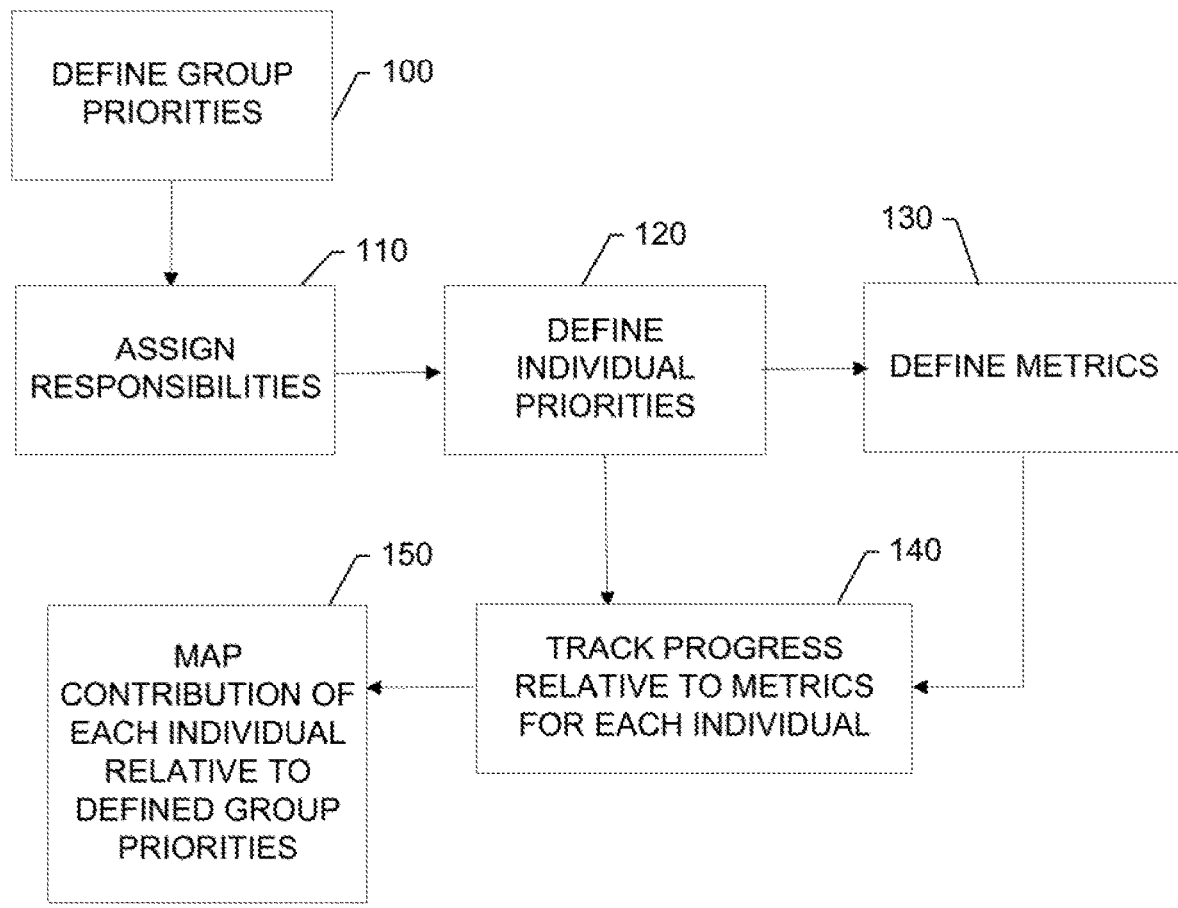
FIG. 3 is a flowchart according to an exemplary method for providing an energy map according to exemplary embodiments of the present invention.

An exemplary embodiment of the invention will now be described with reference to FIGS. 2 and 3. FIG. 2 shows certain elements of an apparatus for providing an energy map according to an exemplary embodiment. FIG. 3 illustrates a flowchart of a method for providing an energy map according to an exemplary embodiment. The apparatus of FIG. 2 may be employed, for example, on a client (e.g., any of the clients 20 of FIG. 1) or a variety of other devices (such as, for example, a network device, server, proxy, or the like (e.g., the web server 40 of FIG. 1)). Alternatively, embodiments may be employed on a combination of devices. Accordingly, some embodiments of the present invention may be embodied wholly at a single device (e.g., the web server 40) or by devices in a client/server relationship (e.g., the web server 40 and one or more clients 20). Furthermore, it should be noted that the devices or elements described below may not be mandatory and thus some may be omitted in certain embodiments.

Referring now to FIG. 2, an apparatus for providing an energy map is provided. The apparatus may include or otherwise be in communication with a processor 50, a user interface 52, a communication interface 54 and a memory device 56. The memory device 56 may include, for example, volatile and/or non-volatile memory. The memory device 56 may be configured to store information, data, applications (e.g., the client application 22 or the server application 42), instructions or the like for enabling the apparatus to carry out various functions in accordance with exemplary embodiments of the present invention. For example, the memory device 56 could be configured to buffer input data for processing by the processor 50. Additionally or alternatively, the memory device 56 could be configured to store instructions for execution by the processor 50. As yet another alternative, the memory device 56 may be one of a plurality of databases that store information.

The processor 50 may be embodied in a number of different ways. For example, the processor 50 may be embodied as various processing means such as a processing element, a coprocessor, a controller or various other processing devices including conventional computer processors or integrated circuits such as, for example, an ASIC (application specific integrated circuit), an FPGA (field programmable gate array), a hardware accelerator, signal processor, or the like. In an exemplary embodiment, the processor 50 may be configured to execute instructions stored in the memory device 56 or otherwise accessible to the processor 50.

Meanwhile, the communication interface 54 may be any means such as a device or circuitry embodied in either hardware, software, or a combination of hardware and software that is configured to receive and/or transmit data from/to a network (e.g., the network 30) and/or any other device or module in communication with the apparatus. In this regard, the communication interface 54 may include, for example, an antenna and supporting hardware and/or software for enabling communications with a wireless communication network and/or a communication modem and/or other hardware/software for supporting communication via cable, digital subscriber line (DSL), universal serial bus (USB) or other wireline based communication mechanisms.

The user interface 52 may be in communication with the processor 50 to receive an indication of a user input at the user interface 52 and/or to provide an audible, visual, mechanical or other output to the user. As such, the user interface 52 may include, for example, a keyboard, a mouse, a joystick, a touch screen, trackball, a display, a microphone, a speaker, or other input/output mechanisms. In an exemplary embodiment in which the apparatus is embodied as a server or some other network device, the user interface 52 may be limited, or even eliminated. However, in an embodiment in which the apparatus is embodied as a client device, the user interface 52 may include, among other devices or elements, any or all of a speaker, a microphone, a display, and a keyboard or the like.

In an exemplary embodiment, the processor 50 may be embodied as, include or otherwise control a priority definer 58, a priority tracker 60, and an energy mapper 62. The priority definer 58, the priority tracker 60, and the energy mapper 62 may each be any means such as a device or circuitry embodied in hardware, software or a combination of hardware and software that is configured to perform the corresponding functions of the priority definer 58, the priority tracker 60, and the energy mapper 62, respectively, as described below. In some embodiments, an instance of each of the priority definer 58, the priority tracker 60, and the energy mapper 62 may be included at either or both of the clients 20 (e.g., via the client application 22) and the web server 40 (e.g., via the server application 42). However, in other embodiments one or more of the priority definer 58, the priority tracker 60, and the energy mapper 62 may be instantiated at the clients 20, while at least remaining ones of the priority definer 58, the priority tracker 60, and the energy mapper 62 are embodied at the web server 40.

The priority definer 58 may be configured to enable priorities to be defined. In this regard, for example, the priority definer 58 may generate popup windows, control consoles, or other user interface mechanisms to enable entry of priorities and/or information associated with defined priorities. As an example, the priority definer 58 may be configured to provide a user interface to enable a user (e.g., one or more executive team members) to enter information for use in defining company priorities such as core purpose, core values, core competency information and/or the like. FIG. 4a illustrates an exemplary display of such an interface. In this regard, as shown in FIG. 4a, multiple core values and/or core competencies may be defined for a particular core purpose. Once provided, the information may be linked to other information or may be reviewed (e.g., via the client application 22), approved, augmented or commented on by members of the executive team. The information may provide background or a basis for the definition of priorities via other interface mechanisms. FIGS. 4b and 4c illustrate an additional exemplary display interface to enter information for use in defining company priorities such as core purpose, core values, core competency information and/or the like.

In some embodiments, the priority definer 58 may also enable a user to provide information related to company priorities defined with respect to various different time periods. For example, as shown in FIG. 4a, which illustrates an exemplary display of an interface for providing information related to quarterly planning, the priority definer 58 may generate a user interface mechanism for defining quarterly themes, outcomes and/or an indication of how success may be measured for quarterly goals. Company priorities or in a more generic sense, group priorities, may also be indicated or definable via the interface mechanism. FIG. 5a illustrates an exemplary display of an interface for providing information related to yearly planning. As such, the priority definer 58 may generate a user interface mechanism for defining yearly themes, outcomes and/or an indication of how success may be measured for yearly goals similar to the description provided above. Thus, group priorities (e.g., company priorities) may also be indicated or definable via the interface mechanism. FIGS. 5b and 5c illustrate an additional exemplary display interface for providing information related to yearly planning. Longer term goals may also be defined such as is illustrated in FIG. 6a, which shows a display of an interface for providing information related to three to five year planning. FIG. 6b illustrates an additional exemplary display interface for providing information related to three to five year planning.

In some embodiments, certain quarterly priorities may also be reflected in the yearly priorities or vice versa. Thus, for example, status with respect to a longer term goal (e.g., a yearly goal) may be measured or defined in terms of status with respect to shorter term goals at various increments (e.g., quarterly). However, it is not necessary for direct correspondence between the two lists as, for example, some yearly priorities may have actions deferred to other quarters, or some priorities may only be defined for a particular quarter and may not be related to yearly priorities. In embodiments where correspondence between priorities exists among different lists, links may be available to shift between interfaces covering different defined time periods. Additionally, a mechanism for entering or selecting a desired time period for display may be provided.

In an exemplary embodiment, the group priorities defined, for example, at the company level for various time periods may be defined based on input from one or more executive team members based on the perspectives of each such team member. The input may be provided, for example, via one of the clients 20. In some cases, additional material useful for defining priorities may be provided at various levels to enable the construction of group priorities. FIG. 7 illustrates an example of an interface page that may be used by a team member to define what the year is about from the team member's perspective. FIG. 8 illustrates a similar page defined for quarterly periodicity. The theme may be imported from a higher level, or the themes provided at lower levels may be used to define higher level themes. Outcomes may also be defined as well as brainstorming ideas for the defined period (e.g., the quarter or the year). In some embodiments, other team members, employees or group members may vote on brainstormed ideas to determine whether such ideas should be presented at a higher level or achieve more focused attention. In some instances, the information relating to what the quarter, year or other defined period is about may be dependent upon the group priorities that have been defined and have an impact on the individual, group or team at another level in an organization. Lower level priorities may therefore be defined based on higher level themes or priorities and the necessary impact such themes or priorities have on other individuals based on responsibilities assigned to those respective individuals.

Along with defining group priorities, the priority definer 58 may also be employed to define priorities for individuals based on tasks, priorities, projects or the like assigned to the respective individuals. Other metrics associated with the priorities may also be desirable for consideration and may also be provided via the priority definer 58 in some embodiments. In this regard, for example, the priority definer 58 may be used not only to enable the definition of group and individual priorities, which may in some cases be defined based on assigned responsibilities, but the priority definer 58 may also be used to define various metrics associated with the defined priorities. Metrics may include various time tables for completion of projects or priorities, measurable milestones regarding illustrating completion or competency with respect to projects or priorities, process related steps, due dates, etc., or other records. In some cases, the metrics may include information indicative of people, groups, entities, or the like who may have a relationship to a particular priority. As such, for example, the relationships between such people may be important to knowing or gauging the status of a particular project or priority. The people of interest with respect to various relationships may be, for example, employees with particular responsibilities in a process, customers to whom certain materials must be provided, shareholders with deadlines for receiving reports, or others. FIGS. 9a and 9b illustrate exemplary displays in which some of the information described above may be provided and/or referenced in accordance with an exemplary embodiment.

In some embodiments, other information may also be provided, referenced and/or managed via the priority definer 58. Some of the other information may be directly related to priority definition, such as core values. In this regard, FIGS. 10a and 10b illustrate examples of a core values health check page that may provide an entry and/or review mechanism for information related to core values, dates associated with the core values and stories associated with the core values. FIG. 11 illustrates a display of a page for defining strengths, weaknesses, opportunities and/or threats that may impact priorities via the individuals, groups, entities or the like that are associated with the respective priorities. FIGS. 12a-e illustrate displays for a page for providing or accessing other information that may be applicable to priority definition.

Some embodiments may allow for defining connections between group priorities and/or individual priorities to allow for the connecting of strategic items (strategies, goals, priorities, etc.) and execution items. For example, in some embodiments connections may be defined between mid-term strategy items and annual company/group goals, between annual company/group goals and quarterly company/group goals, and between quarterly company/group goals and quarterly individual goals, such as by using priority definer 58. Such embodiments may allow users to visualize and better understand how execution items are aligned to achieve company strategies. Such embodiments may further allow users to visualize how daily, weekly, monthly, and quarterly execution status is contributing to the success or failure to achieve company strategies.

Figure 13C:
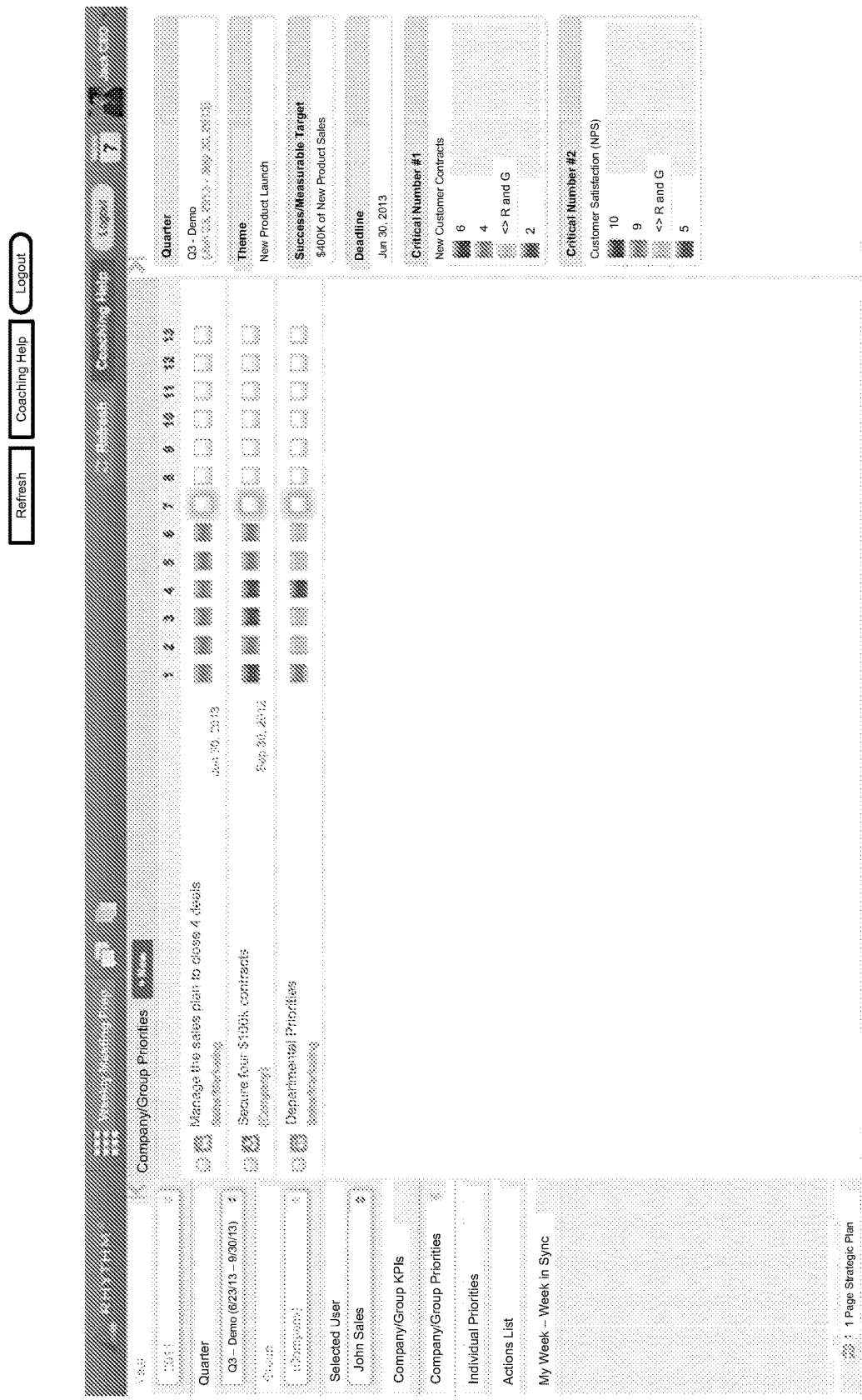
Figure 13D:
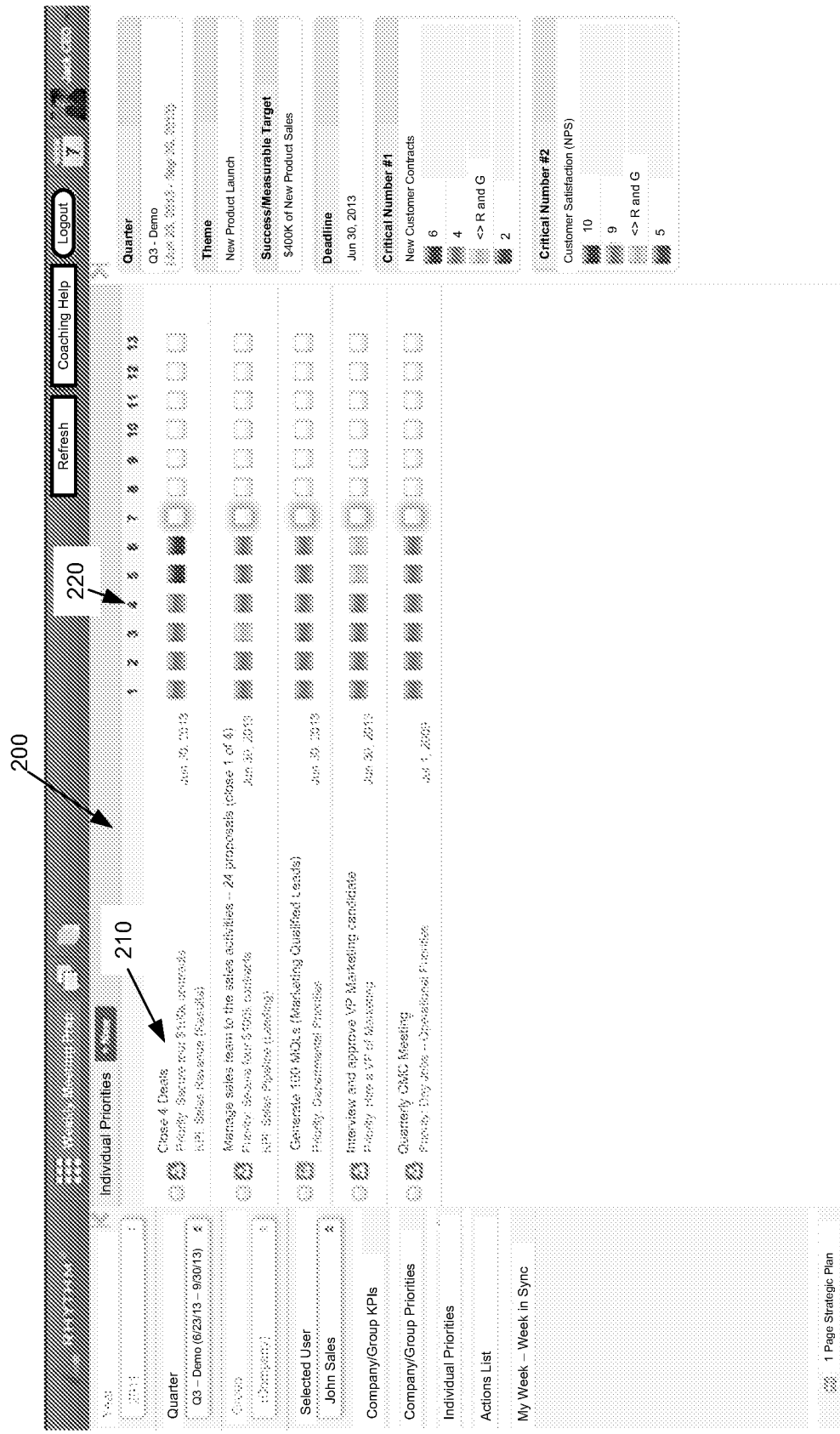

The priority tracker 60 may be configured to track updated information corresponding to the defined priorities. As such, for example, the priority tracker 60 may be configured to receive indications regarding status from one or more individuals in relation to corresponding priorities associated with the respective individuals. In some cases, the indications may relate to individual priorities that may be associated with a group priority. For example, if a group priority is defined for generating a new company website, individual priorities may be defined for such related tasks as graphic design, defining the user interface, interacting with a contractor, or other tasks. Each individual task or priority may be assigned to one or more individuals contributing to the corresponding group priority. Thus, for example, each individual may be asked to periodically provide an update with respect to their own (or their sub-group's) status with respect to achieving certain metrics of achievement, milestones or other measurable criteria for their respective individual priorities. The priority tracker 60 may track these updates for correlation with respect to group priorities. FIGS. 13a-d illustrate exemplary executive dashboard displays according to an exemplary embodiment of the present invention. FIG. 13a shows a weekly status display 200 indicating, for one individual, a plurality of the priorities assigned to the individual (e.g., in column 210) along with a periodic feedback mechanism (e.g., weekly status indicators 220) for defining status for the corresponding period. FIG. 13b shows an exemplary weekly status display of company/group KPIs and FIG. 13c shows an exemplary weekly status of company/group priorities. FIG. 13d shows another exemplary weekly status display 200 indicating, for one individual, a plurality of the priorities assigned to the individual (e.g., in column 210) along with a periodic feedback mechanism (e.g., weekly status indicators 220) for defining status for the corresponding period.

The weekly status display 200 of FIG. 13a or 13d may be part of an executive dashboard produced by the client application 22 for a particular team member subsequent to a login of the particular team member. The dashboard may be customizable to show a particular view to the logged in team member based on user preferences. Alternatively, the view displayed on initial login may be predefined and navigable tabs or pages may be provided to enable the user to access a page such as the ones shown in FIGS. 13a-d. The view displayed may also be dependent upon a time period selected (e.g., yearly, quarterly, etc.). Thus, for example, a quarter may be broken into weeks and the user may be enabled to provide a weekly status report for each assigned individual priority. In an exemplary embodiment, the weekly status report may be provided by filling in a corresponding circle or hotspot with a color indicator that correlates to a particular status. Monthly, biweekly, daily, hourly, or any other time periods could alternatively be defined. Furthermore, colored, numbered, or otherwise distinctive flags, shapes or other indicia may also be defined to correspond with particular status reports. As such, for example, the user may provide indications with respect to status by selecting a dark green fill to indicate completion of a priority or lighter green to indicate satisfactory progress (e.g., relative to defined metrics) and/or expected completion for a particular priority. Meanwhile, for example, white may indicate an un-updated status, red may indicate failure or inability to complete a project, and yellow may indicate concern over whether a priority can be completed on time or within defined parameters. Other status indication mechanisms could alternatively be provided. In this regard, the user may be enabled to custom define colors or other indicators and their respective meanings.

Based on the inputs defined by numerous individuals, embodiments of the present invention may enable tracking with regard to group priorities. In this regard, for example, the priority tracker 60 may be further configured to correlate the received indications of status from a plurality of individuals to respective group priorities. Thus, the priority tracker 60 can determine to which group priority each individual response corresponds. Based on the correlation, the energy mapper 62 can provide a dashboard display useable to graphically display information related to the indications provided.

The energy mapper 62 may be configured to provide a representation of the group priorities, which may include providing an indication of a predefined importance associated with each of the group priorities. In some cases, the predefined importance may be indicated by an ordering of the group priorities. However, other mechanisms may also be provided for indicating the predefined importance such as a graded scale value assigned to each priority or other methods. In addition to providing the representation of the group priorities, the energy mapper 62 may be further configured to generate a graphical representation of a respective amount of resources associated with each of the group priorities based on the received indications. As an example, an indicator corresponding to the indication provided by each respective individual may be provided to show how many individuals are working on a particular priority and also to show the status reported by each respective individual.

FIGS. 14a-c show exemplary executive dashboard displays including an example of pages generated by the energy mapper 62 according to some embodiments. As shown in FIG. 14a, a group priority window 300 may show group priorities 310 (e.g., in order of importance or with some other indicia of importance) and an overall status for each respective group priority. More detailed information about each group priority may be accessible by clicking on or otherwise selecting a corresponding group. Each group priority may also have a corresponding status bar 320 providing an indicator 322 for each corresponding individual priority associated with the group priority. Thus, the status bar 320 may indicate the number of individual priorities that have been correlated to the group priority. Accordingly, by reviewing the status bar 320 for a particular group priority, a user of the executive dashboard may determine the amount of resources (e.g., as indicated by the respective number of individuals having individual priorities associated with the corresponding group priority) associated with the particular group priority. The user may also determine that status or each individual and be able to retrieve more detailed information about any individual or group priority via linking to such information.

Such a dashboard view as that shown in FIGS. 14a-c may enable an assessment of whether the importance of the particular group priority is accurately reflected by the resources devoted thereto. Thus, for example, situations where highly important priorities are supported by low numbers of individuals or low importance priorities are supported by high numbers of individuals may be discernable. In some embodiments, situations where an imbalance in priority ranking versus resource allocation may be highlighted to further apprise a user of the situation. In this regard, for example, the energy mapper 62 may be configured to identify or highlight a group priority that has a higher ranking, but less devoted resources than other group priorities.

In an exemplary embodiment, each indicator may be selectable to link to information associated with the respective individual priorities. Thus, for example, by selecting the indicator 322, the user may determine which individual corresponds to the indicator and also see, for example, detailed information about the individual, information about other priorities associated with the individual, the current status report (e.g., the status for the current time period), prior status reports for the same priority, and/or other like information.

In some embodiments, in addition or as an alternative to the group priority window 300, a key priority indicator window 350 may also be included in the executive dashboard as shown in FIGS. 14a and 14c. The key priority indicator window 350 may include a customized list of priorities that may be determined by the user to be important for tracking. As such, for example, although some priorities may not correspond to important priorities from the company or overall group perspective, an individual may define particular priorities to be key or important with respect to their own particular perspective. Accordingly, the individual may define a personalized priority indicator window showing status information in the form of an energy map as described above. Either or both of the key priority indicator window 350 or the group priority window 300 of FIGS. 14a-c may be understood to represent an energy map indicative of the resources devoted to each of various different priorities.

An exemplary embodiment of the invention will now be described in reference to FIG. 3, which illustrates a flowchart of a method for providing an energy map according to an exemplary embodiment. As shown in FIG. 3, group priorities may initially be defined at operation 100. Although not required, responsibilities for various ones of the group priorities may be assigned at operation 110. Subsequent to, or even via, the assignment of responsibilities, priorities may be defined for individuals at operation 120. Metrics may also be defined at operation 130. In some embodiments, the priority definer 58 may perform operations 100 to 130.

After priority definition, tracking with respect to the defined priorities may be accomplished (e.g., by the priority tracker 60) at operation 140. The tracking may be accomplished via correlation of indications regarding the status of individual entities with respect to individual priorities. A contribution of each individual relative to defined group priorities may then be accomplished at operation 150 (e.g., by the energy mapper 62). As a result, a graphical representation may be provided to show the amount of resources associated with each group priority based on the indications received via correlation of the received indications to respective group priorities.

FIG. 15 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a computing device, and executed by a processor of the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing an energy map, as shown in FIG. 15, includes receiving an indication of status for each of a plurality of individual entities with respect to corresponding priorities defined for each respective individual entity at operation 610 and correlating received indications of status to respective group priorities at operation 620. The method may further include providing a representation of a plurality of the group priorities at operation 630 and mapping an amount of energy associated with the group priorities by providing a graphical representation of a respective amount of resources associated with the group priorities based on the received indications at operation 640.

In some embodiments, additional optional operations may also be performed. Some examples of optional operations are shown in FIG. 15 in dashed lines. For example, the method may further include defining the group priorities, defining the individual priorities based on the defined group priorities, and defining metrics associated with the individual priorities at operation 600. In an exemplary embodiment, the method may further include enabling access to detailed information regarding each of the resources via selection of graphical indicia corresponding to each respective one of the resources at operation 650.

In an exemplary embodiment, providing the representation of the plurality of the group priorities may include presenting the group priorities ordered based on a predefined importance to enable a comparison between the predefined importance of a group priority and the mapped amount of energy for the group priority or providing a graphical indicia of status with respect to each of the group priorities. In some cases, mapping the amount of energy associated with the group priorities may include providing graphical indicia of status with respect to each of the resources based on a corresponding received indication for each of the resources. In an exemplary embodiment, enabling access to detailed information may include providing a link to information specific to an individual entity associated with the selected graphical indicia. The detailed information may include a report of progress of the individual entity with respect to various defined metrics.

FIG. 16 illustrates an exemplary display interface for providing connections between strategy items and annual goals according to an exemplary embodiment of the present invention. FIG. 16 illustrates a display of strategy items provided on strategic plan screen 1600. The strategic plan screen 1600 may display multiple Mid-Term Strategy Items 1602 that have been defined for a company. Graphic icons 1604 display the number of currently working annual goals which have been defined as connected to each respective mid-term strategy item. Strategic plan screen 1600 may provide a visualization of connections between mid-term strategy items and annual goal items and the amount of work being applied to achieve specific strategy items. In some embodiments, a user may view detailed information associated with a particular strategy item, as illustrated in FIG. 17, by selecting a displayed strategy item, such as by clicking on a mid-term strategy item 1602.

FIG. 17 illustrates an exemplary display interface for providing connections between strategy items and annual goals according to an exemplary embodiment of the present invention. FIG. 17 illustrates a detail display of a selected strategy item on mid-term strategy item detail screen 1700. The mid-term strategy item detail screen 1700 may display the mid-term strategy item 1702 selected by a user. The mid-term strategy item detail screen 1700 may provide a list of the annual goal items that have been defined as connected to the mid-term strategy item, such as annual goal items 1704. The mid-term strategy item detail screen 1700 may also provide an indication of the number of quarterly goals items that have been defined as connected to each annual goal item, as well as the execution status of each of the quarterly goals items, such as by status icons 1706. The mid-term strategy item detail screen 1700 may provide a visualization of the connections between a particular mid-term strategy item and annual goal items and the amount of work being applied to achieve the specific strategy item and annual goal items. In some embodiments, a user may view detailed information associated with a particular annual goal item, as illustrated in FIG. 18, by selecting a displayed annual goal item, such as by clicking on an annual goal item 1704.

FIG. 18 illustrates an exemplary display interface for providing connections between quarterly company/group goals and annual goals according to an exemplary embodiment of the present invention. FIG. 18 illustrates a detail display of a selected annual goal item on annual goal item detail screen 1800. The annual goal item detail screen 1800 may display the annual goal item 1802 selected by a user, such as on mid-term strategy item detail screen 1700. The annual goal item detail screen 1800 may display any mid-term strategy items connected to the annual goal item, such as mid-term strategy item 1804. The annual goal item detail screen 1800 may provide a list of the quarterly company/group goal items that have been defined as connected to the annual goal item, such as quarterly company/group goal items 1806. The annual goal item detail screen 1800 may also provide an indication of execution status of each of the quarterly goal items connected to the selected annual goal item, such as by status icons 1808. The annual goal item detail screen 1800 may provide a visualization of the connections between a particular annual goal item and quarterly company/group goal items and the amount of work being applied to achieve the specific annual goal item. In some embodiments, a user may view detailed information associated with a particular quarterly company/group goal item, as illustrated in FIG. 19, by selecting a displayed quarterly company/group goal item, such as by clicking on a quarterly company/group goal item 1806.

FIG. 19 illustrates an exemplary display interface for providing connections between quarterly individual goals and quarterly company/group goals according to an exemplary embodiment of the present invention. FIG. 19 illustrates a detail display of a selected quarterly company/group goal item on quarterly company/group goal item detail screen 1900. The quarterly company/group goal item detail screen 1900 may display the quarterly company/group goal item 1902 selected by a user, such as on annual goal item detail screen 1800. The quarterly company/group goal item detail screen 1900 may display any annual goal items connected to the quarterly company/group goal item, such as annual goal item 1904. The quarterly company/group goal item detail screen 1900 may provide a list of the quarterly individual goal items that have been defined as connected to the quarterly company/group goal item, such as quarterly individual goal items 1906. The quarterly company/group goal item detail screen 1900 may also provide an indication of execution status of each of the quarterly individual goal items connected to the selected quarterly company/group goal item, such as by status icons 1908. The quarterly company/group goal item detail screen 1900 may provide a visualization of the connections between a particular quarterly company/group goal item and quarterly individual goal items and the amount of work being applied to achieve the specific quarterly company/group goal item. In some embodiments, a user may view detailed information associated with a particular quarterly individual goal item, as illustrated in FIG. 20, by selecting a displayed quarterly individual goal item, such as by clicking on a quarterly individual goal item 1906.

FIG. 20 illustrates an exemplary display interface for providing connections between task/action items and quarterly individual goals according to an exemplary embodiment of the present invention. FIG. 20 illustrates a detail display of a selected quarterly individual goal item on quarterly individual goal item detail screen 2000. The quarterly individual goal item detail screen 2000 may display the quarterly individual goal item 2002 selected by a user, such as on quarterly company/group goal item detail screen 1900. The quarterly individual goal item detail screen 2000 may display any quarterly company/group goal items connected to the quarterly individual goal item, such as quarterly company/group goal item 2004. The quarterly individual goal item detail screen 2000 may provide a list of the individual task/action items that have been defined as connected to the quarterly individual goal item, such as individual task/action items 2006. The quarterly individual goal item detail screen 2000 may provide a visualization of the connections between a particular quarterly individual goal item and individual task/action items. Such embodiments may provide visualizations allowing users to effectively understand how strategies are being worked from a strategic item level down to an individual task level.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    receiving one or more indications of status for a plurality of individual entities with respect to corresponding execution elements defined for each respective individual entity of the individual entities;
    correlating the indications of status to at least one individual entity priority in a set of individual entity priorities for a time period;
    correlating each of the individual entity priorities for the time period to at least one group priority in a set of group priorities for the same time period;
    correlating each group priority in a set of group priorities for a time period to at least one group priority in a set of group priorities for a subsequent time period;
    providing a representation of connections between a group priority for a respective time period and one or more group priorities for a subsequent time period or one or more individual entity priorities, or a representation of connections between an individual entity priority and one or more execution elements; and
    mapping an amount of human energy associated with the group priorities or the individual entity priorities by providing one or more graphical representations of an amount of resources associated with the group priorities or the individual entity priorities based on the indications of status.

2. The method of claim 1, further comprising:
    defining connections between one or more execution elements and one or more individual entity priorities;
    defining connections between one or more individual entity priorities and one or more group priorities in a same time period; and
    defining connections between one or more group priorities in a respective time period and one or more group priorities in a subsequent time period.

3. The method of claim 1, wherein providing a representation of connections further comprises enabling access to detailed information regarding each of the connected group priorities or individual entity priorities via selection of a graphical indicia corresponding to each displayed connection.

4. The method of claim 1, wherein mapping the amount of the human energy associated with the group priorities or the individual entity priorities further comprises providing a graphical indicia of status with respect to each of the resources based on a corresponding received indication for each of the resources.

5. A computer program product comprising a non-transitory computer readable storage medium and computer program instructions stored therein, the computer program instructions comprising commuter program instructions configured to:
   receive one or more indications of status for a plurality of individual entities with respect to corresponding execution elements defined for each respective individual entity of the individual entities;
   correlate the indications of status to at least one individual entity priority in a set of individual entity priorities for a time period;
   correlate each of the individual entity priorities for the time period to at least one group priority in a set of group priorities for the same time period;
   correlate each group priority in a set of group priorities for a time period to at least one group priority in a set of group priorities for a subsequent time period;
   provide a representation of connections between a group priority for a respective time period and one or more group priorities for a subsequent time period or one or more individual entity priorities, or a representation of connections between an individual entity priority and one or more execution elements; and
   map an amount of human energy associated with the group priorities or the individual entity priorities by providing one or more graphical representations of an amount of resources associated with the group priorities or the individual entity priorities based on the indications of status.

6. The computer program product of claim 5 further comprising the commuter program instructions configured to:
   define connections between one or more execution elements and one or more individual entity priorities;
   define connections between one or more individual entity priorities and one or more group priorities in a same time period; and
   define connections between one or more group priorities in a respective time period and one or more group priorities in a subsequent time period.

7. The computer program product of claim 5, wherein providing a representation of connections further comprises enabling access to detailed information regarding each of the connected group priorities or individual entity priorities via selection of a graphical indicia corresponding to each displayed connection.

8. The computer program product of claim 5, wherein mapping the amount of the human energy associated with the group priorities or the individual entity priorities further comprises providing a graphical indicia of status with respect to each of the resources based on a corresponding received indication for each of the resources.

9. An apparatus comprising at least one processor and at least one memory including computer program instructions, the at least one memory and the commuter program instructions being configured to, in cooperation with the at least one processor, cause the apparatus at least to:
   receive one or more indications of status for a plurality of individual entities with respect to corresponding execution elements defined for each respective individual entity of the individual entities;
   correlate the indications of status to at least one individual entity priority in a set of individual entity priorities for a time period;
   correlate each of the individual entity priorities for the time period to at least one group priority in a set of group priorities for the same time period;
   correlate each group priority in a set of group priorities for a time period to at least one group priority in a set of group priorities for a subsequent time period;
   provide a representation of connections between a group priority for a respective time period and one or more group priorities for a subsequent time period or one or more individual entity priorities, or a representation of connections between an individual entity priority and one or more execution elements; and
   map an amount of human energy associated with the group priorities or the individual entity priorities by providing one or more graphical representations of an amount of resources associated with the group priorities or the individual entity priorities based on the indications of status.

10. The apparatus of claim 9, further comprising the at least one memory and the commuter program instructions being configured to cause the apparatus to:
    define connections between one or more execution elements and one or more individual entity priorities;
    define connections between one or more individual entity priorities and one or more group priorities in a same time period; and
    define connections between one or more group priorities in a respective time period and one or more group priorities in a subsequent time period.

11. The apparatus of claim 9, wherein providing a representation of connections further comprises enabling access to detailed information regarding each of the connected group priorities or individual entity priorities via selection of a graphical indicia corresponding to each displayed connection.

12. The apparatus of claim 9, wherein mapping the amount of the human energy associated with the group priorities or the individual entity priorities further comprises providing a graphical indicia of status with respect to each of the resources based on a corresponding received indication for each of the resources.

* * * * *